United States Patent [19]

Ito et al.

[11] Patent Number: 5,880,179
[45] Date of Patent: *Mar. 9, 1999

[54] MOLDED PRODUCTS FOR HIGH VOLTAGE APPARATUS COMPRISING BROMINATED EPOXY RESINS

[75] Inventors: Hiromi Ito; Takumi Kikuchi; Hirofumi Fujioka; Hirozoh Kanegae; Yoshifumi Itabashi; Fumio Nogami, all of Amagasaki, Japan

[73] Assignee: Mitsubishi Denki Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 774,068

[22] Filed: Dec. 23, 1996

Related U.S. Application Data

[63] Continuation of Ser. No. 395,881, Feb. 28, 1995, abandoned.

[30] Foreign Application Priority Data

Mar. 4, 1994 [JP] Japan .................................... 6-034860

[51] Int. Cl.$^6$ ............................. C08L 63/02; H02K 1/04; H01F 27/30
[52] U.S. Cl. .......................... 523/433; 523/443; 523/466; 310/43; 336/205; 528/102
[58] Field of Search ................................... 523/435, 443, 523/466, 433; 528/102, 112, 97, 96; 310/43; 336/205

[56] References Cited

U.S. PATENT DOCUMENTS

| | | | |
|---|---|---|---|
| 3,268,619 | 8/1966 | Nametz ..................................... | 260/831 |
| 4,042,550 | 8/1977 | Tuller et al. ............................. | 523/434 |
| 4,202,811 | 5/1980 | Michael et al. .......................... | 523/435 |
| 4,271,061 | 6/1981 | Suzuki et al. ............................ | 523/443 |
| 4,532,308 | 7/1985 | Sato et al. ................................. | 528/96 |
| 4,617,330 | 10/1986 | Thai et al. ............................... | 523/443 |
| 4,656,294 | 4/1987 | Kanayama ............................... | 549/335 |
| 5,137,940 | 8/1992 | Tomiyoshi ............................... | 523/443 |

FOREIGN PATENT DOCUMENTS

| | | |
|---|---|---|
| 0 450 944 A2 | 10/1991 | European Pat. Off. . |
| 0 499 585 A1 | 8/1992 | European Pat. Off. . |
| 242655 | 9/1989 | Japan ..................................... 523/443 |
| 4-337317 | 5/1991 | Japan . |
| 174434 | 7/1991 | Japan ..................................... 523/443 |
| 3-009920 | 9/1993 | Japan . |

OTHER PUBLICATIONS

JP03–009,920 Abstract, World Patents Index #91–061419, STN International, Columbus, OH (1991).
JP04–337,317 Abstract, World Patent Index #93–011636, STN International, Columbus, OH (1993).
Derwent Publications Ltd., London, GB; AN 90–214330 & JP –2 145 416, Jun. 1990.
Database WPI, Chemical Patents Index, Basic Abstracts Journal, Section A:, Week 8648, Jan. 14, 1987, AN 86–301600.

*Primary Examiner*—Donald R. Wilson
*Attorney, Agent, or Firm*—Burns, Doane, Swecker & Mathis, LLP

[57] ABSTRACT

"Molded products for high voltage apparatus comprising an" epoxy resin composition for molding comprising an epoxy resin (A), an acid anhydride (B), a curing accelerator (C), at least one coupling agent (D) and a filler (E). The epoxy resin (A) is a bifunctional brominated bisphenol A or a brominated bisphenol F, "epoxy resin and at least one bisphenol A, bisphenol F or bisphenol epoxy resin". The coupling agent (D) is selected from the group consisting of epoxysilane type coupling agents, phenylaminosilane type coupling agents, mercaptosilane type coupling agents and titanate type coupling agents, which has an average particle diameter of not more than 60 $\mu$m and in which the content of particles having a diameter of not more than 5 $\mu$m is not less than 5% by weight. The filler (E) comprises at least one of silica fillers or alumina fillers. The ratio of the number of acid anhydride groups of the acid anhydride (B) to the number of epoxy groups of the epoxy resin (A) is 0.5 to 1.5; the amount of the curing accelerator (C) is 0.5 to 10 parts by weight based on 100 parts by weight of the epoxy resin (A); the amount of the coupling agent (D) is 0.05 to 5 parts by weight based on 100 parts by weight of the filler (E); and the content of the filler (E) is 35 to 95% by weight of the resin composition. The epoxy resin composition has excellent mechanical properties such as high mechanical strength and toughness, and excellent thermal resistance.

4 Claims, 8 Drawing Sheets

MOLDED PRODUCTS FOR HIGH VOLTAGE APPARATUS COMPRISING BROMINATED EPOXY RESINS

This application is a continuation of application Ser. No. 08/395,881, filed Feb. 28, 1995 (now abandoned).

BACKGROUND OF THE INVENTION

The present invention relates to an epoxy resin composition for molding, a molded product thereof and a process for preparing the same, and more particularly to an epoxy resin composition for molding having excellent mechanical properties such as high mechanical strength and high toughness and excellent thermal resistance, a process for preparing a molded product used for apparatus for high voltage made of the epoxy resin composition for molding, and a molded product used for apparatus for high voltage having high crack resistance and high reliability, such as a molded transformer, a molded motor or a gas insulated apparatus, which is produced by the above process.

Conventionally, a molded product used for apparatus for high voltage such as a molded transformer or a molded motor has been produced from an epoxy resin composition comprising a bisphenol A type epoxy resin, an acid anhydride and an inorganic filler such as silica by using a casting method or a pressure gelation method. It is necessary that these molded products do not have voids which cause corona discharge in a molded resin and have characteristics such as high crack resistance for heat cycles and external stress for a long period of time because reliability is required for these molded products for a long period of time.

It is thought that cracks of the molded product are generated by the stress originated in an inserted material embedded in the molded product. The stress σ is briefly represented by the equation:

$$\sigma = E \times (\alpha_R - \alpha_I) \times (T_g - T_o)$$

wherein E is an elastic modulus of a molded resin, $\alpha_R$ is a coefficient of thermal expansion of a molded resin, $\alpha_I$ is a coefficient of thermal expansion of an inserted material, $T_g$ is a glass transition temperature of a molded resin and $T_o$ is the lowest temperature during a heat cycle test. The term "molded resin" is intended to mean a resin used in a molded product.

Conventionally, when an epoxy resin composition is used as a molded resin, mechanical strength of an obtained molded product becomes insufficient. Accordingly, by adding an inorganic filler such as silica to the epoxy resin composition, $\alpha_R$ is lowered, $T_g$ is adjusted to a relatively low temperature as high as about 100° C. and stress is reduced, so that the generation of cracks is restrained and crack resistance is imparted to a molded product. Therefore, if mechanical properties are improved by using the inorganic filler, the thermal resistance of conventional molded products becomes considerably low as high as 70° to 80° C. or so.

Accordingly, in recent years, it has been required that the molded resin is thinned and improved in thermal resistance in the process of miniaturizing of the scale of the molded product and increase of capacity of the molded product. Therefore, it has been eagerly desired to develop a resin composition which can provide a molded resin which is excellent in mechanical properties and thermal resistance.

The present invention has been accomplished in consideration of the above prior art.

It is an object of the present invention to provide a resin composition having excellent mechanical properties and high thermal resistance.

It is a further object of the present invention to provide a molded product used for apparatus for high voltage prepared by molding the resin composition, which is excellent in crack resistance, and the like and which has high reliability.

It is a still further object of the present invention to provide a process for preparing the molded product.

These and other objects of the present invention will become apparent from the description hereinafter.

SUMMARY OF THE INVENTION

In accordance with the present invention, there are provided ① an epoxy resin composition for molding comprising as main components, an epoxy resin (A) comprising at least one epoxy resin selected from an epoxy resin (A-1) represented by the general formula (I):

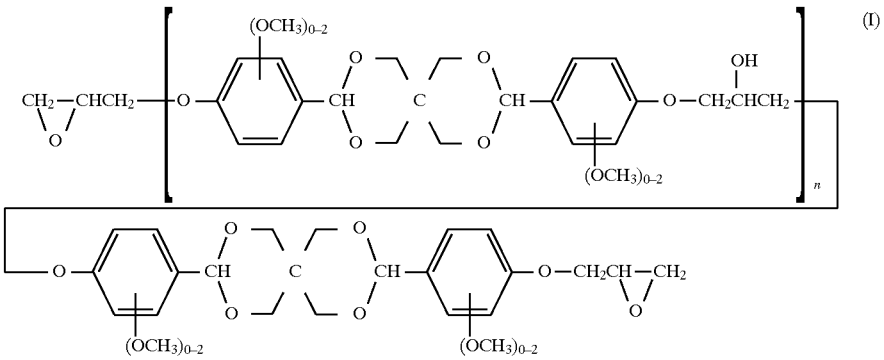

wherein the average of n is 0 to 4, an epoxy resin (A-2) represented by the general formula (II):

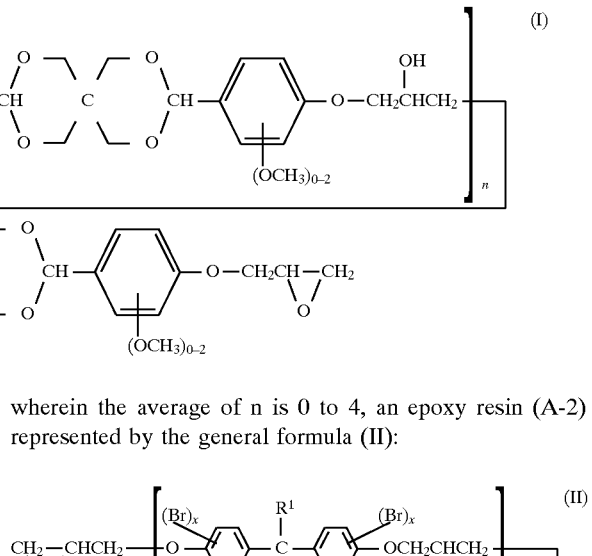

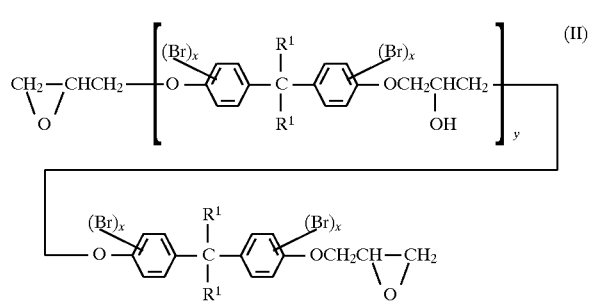

wherein each of $R^1$ is independently hydrogen atom or methyl group, each of x is independently an integer of 1 to 4 and the average of y is 0 to 4, an epoxy resin (A-3) represented by the general formula (III):

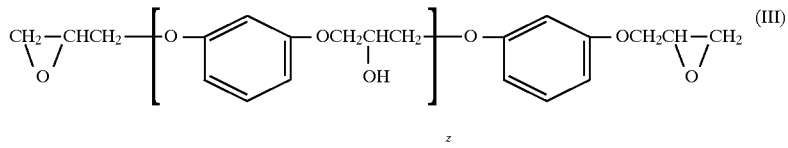

wherein the average of z is 0 to 4 and an epoxy resin (A-4) represented by the general formula (IV):

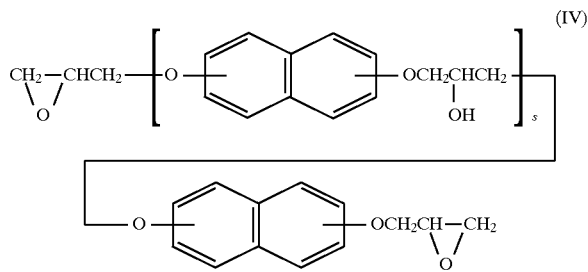

wherein the average of s is 0 to 4, an acid anhydride (B), a curing accelerator (C), at least one coupling agent (D) selected from epoxysilane type coupling agents, phenylaminosilane type coupling agents, mercaptosilane type coupling agents and titanate type coupling agents, and a filler (E) comprising at least one of silica fillers and alumina fillers, which has an average particle diameter of not more than 60 μm and in which the content of particles having a diameter of not more than 5 μm is not less than 5% by weight, wherein the ratio of the number of acid anhydride groups of the acid anhydride (B)/the number of epoxy groups of the epoxy resin (A) is 0.5 to 1.5, the amount of the curing accelerator (C) is 0.05 to 10 parts by weight based on 100 parts by weight of the epoxy resin (A), the amount of the coupling agent (D) is 0.05 to 5 parts by weight based on 100 parts by weight of the filler (E), and the content of the filler (E) is 35 to 95% by weight, ② a process for preparing a molded product used for apparatus for high voltage made of the above-mentioned epoxy resin composition for molding, comprising the steps of mixing the curing accelerator (C) with a mixture comprising the components for the resin composition not containing the curing accelerator (C) to give the resin composition, injecting the resin composition into a metal mold under a pressure of 5 to 100 kg/cm² and molding the resin composition, ③ a process for preparing a molded product used for apparatus for high voltage made of an epoxy resin composition for molding comprising a epoxy resin (A), a acid anhydride (B), a curing accelerator (C) and a coupling agent (D), comprising the steps of covering an inserted material with which a metal mold is provided with a fiber sheet, mixing the curing accelerator (C) with a mixture comprising the components for the resin composition not containing the curing accelerator (C) to give the resin composition, injecting the resin composition into a metal mold under pressure and molding the resin composition, and ④ a molded product for apparatus used for high voltage produced by the above-mentioned processes.

DETAILED DESCRIPTION

Figure 1:
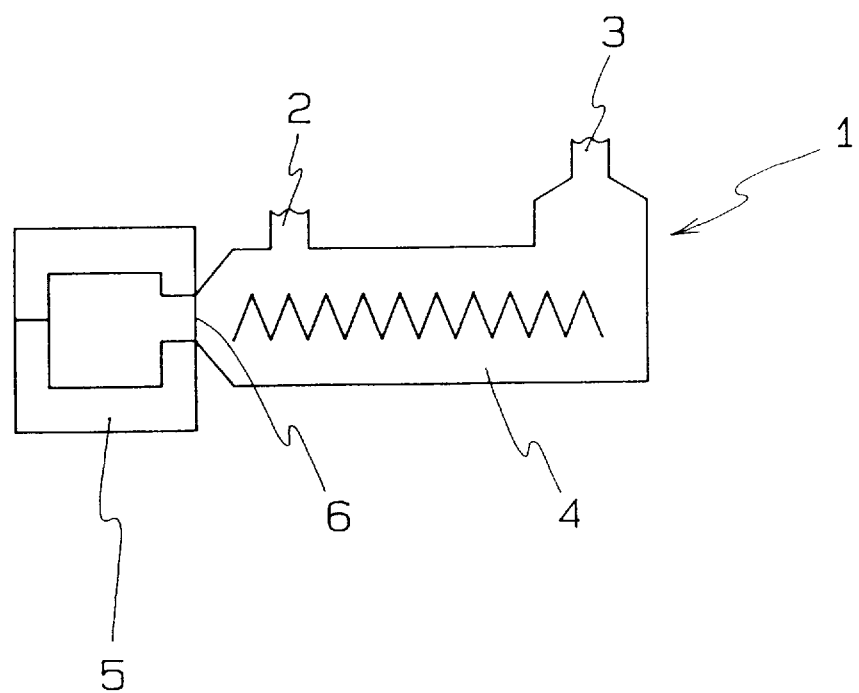
FIG. 1 is a schematic illustrative drawing showing one embodiment of a process for preparing a molded product used for apparatus for high voltage of the present invention.

As mentioned above, the epoxy resin composition for molding of the present invention (hereinafter referred to as epoxy resin composition for molding (I) or resin composition (I)) comprises as main components, an epoxy resin (A) comprising at least one epoxy resin selected from an epoxy resin (A-1) represented by the general formula (I):

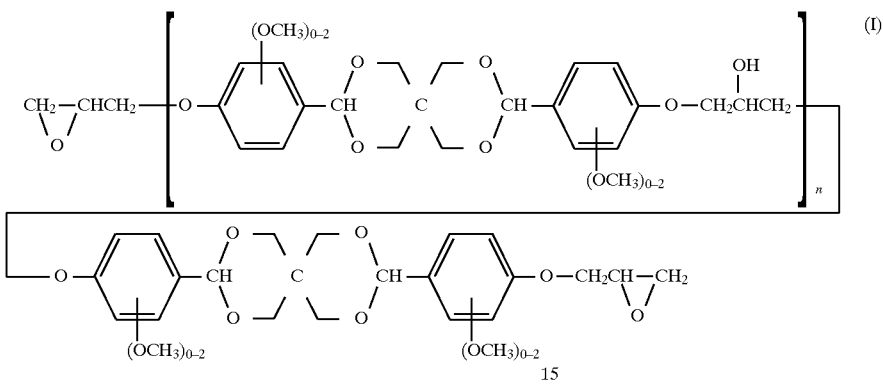

wherein the average of n is 0 to 4, an epoxy resin (A-2) represented by the general formula (II):

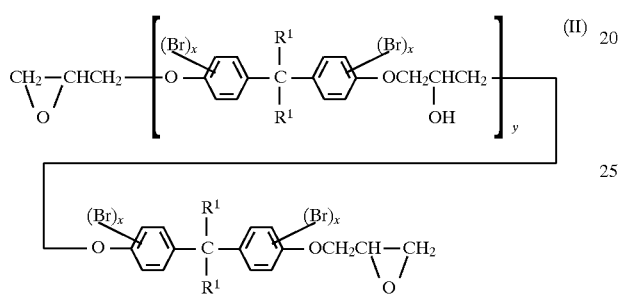

wherein each of $R^1$ is independently hydrogen atom or methyl group, each of x is independently an integer of 1 to 4 and the average of y is 0 to 4, an epoxy resin (A-3) represented by the general formula (III):

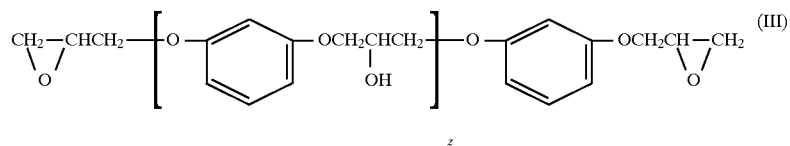

wherein the average of z is 0 to 4, and an epoxy resin (A-4) represented by the general formula (IV):

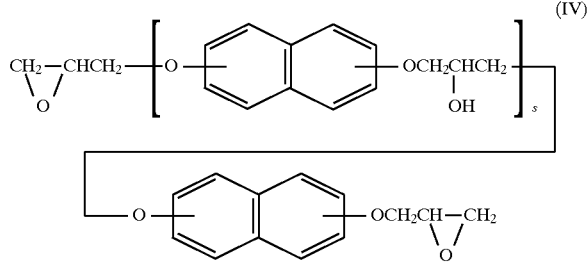

wherein the average of s is 0 to 4, an acid anhydride (B), a curing accelerator (C), at least one coupling agent (D) selected from epoxysilane type coupling agents, phenylaminosilane type coupling agents, mercaptosilane type coupling agents and titanate type coupling agents, and a filler (E) comprising at least one of silica fillers and alumina fillers, which has an average particle diameter of not more than 60 µm and in which the content of particles having a diameter of not more than 5 µm is not less than 5% by weight, wherein the ratio of the number of acid anhydride groups of the acid anhydride (B)/the number of epoxy groups of the epoxy resin (A) is 0.5 to 1.5, the amount of the curing accelerator (C) is 0.05 to 10 parts by weight based on 100 parts by weight of the epoxy resin (A), the amount of the coupling agent (D) is 0.05 to 5 parts by weight based on 100 parts by weight of the filler (E), and the content of the filler (E) is 35 to 95% by weight.

The epoxy resin composition for molding (I) of the present invention contains the epoxy resin (A) which is a bifunctional epoxy resin and has a skeleton of spiro ring, a skeleton of brominated bisphenol A, a skeleton of brominated bisphenol F, a skeleton of single benzene ring or a skeleton of naphthalene. Accordingly, the epoxy resin composition for molding (I) shows excellent mechanical properties such as high mechanical strength and high toughness. Therefore, the generation of stress in the molded product used for apparatus for high voltage (hereinafter also referred to as molded product) obtained from the epoxy resin composition for molding (I) is restrained, and crack resistance, productivity, formability and the like are greatly improved.

As mentioned above, the epoxy resin (A) imparts excellent mechanical properties such as high mechanical strength and high toughness to an obtained epoxy resin composition for molding (I).

The epoxy resin (A) comprises at least one epoxy resin selected from the epoxy resin (A-1) which has a skeleton of spiro ring, represented by the general formula

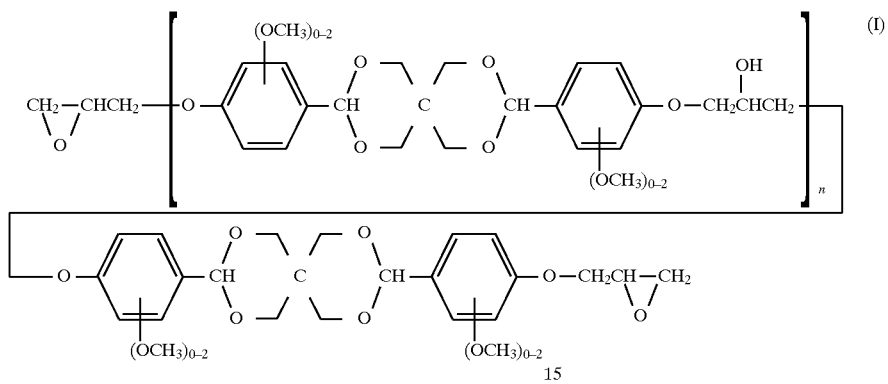

wherein the average of n is 0 to 4, the epoxy resin (A-2) which has a skeleton of brominated bisphenol A or a skeleton of brominated bisphenol F, represented by the general formula (II):

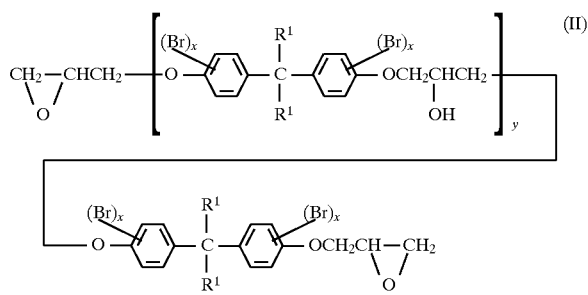

wherein each of $R^1$ is independently hydrogen atom or methyl group, each of x is independently an integer of 1 to 4 and the average of y is 0 to 4, the epoxy resin (A-3) which has a skeleton of single benzene ring, represented by the general formula (III):

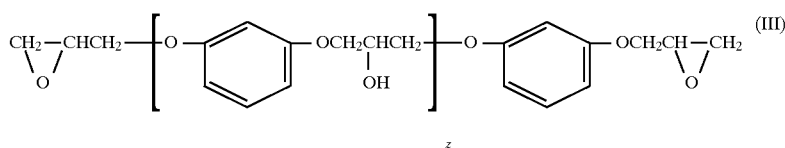

wherein the average of z is 0 to 4, and the epoxy resin (A-4) which has a skeleton of naphthalene ring, represented by general formula (IV):

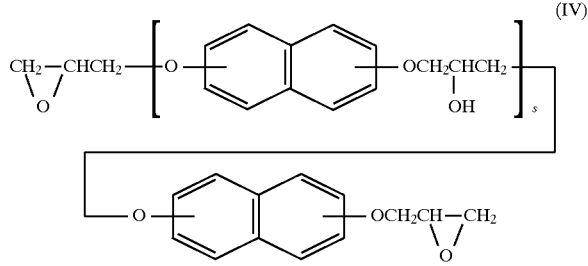

wherein the average of s is 0 to 4.

In the present invention, in addition to the epoxy resins (A-1), (A-2), (A-3) and (A-4), the epoxy resin (A) can contain various epoxy resins, for example, bisphenol A type epoxy resin having a skeleton of bisphenol A, bisphenol F type epoxy resin having a skeleton of bisphenol F, an epoxy resin having a skeleton of biphenyl and the like. When the epoxy resin (A) is used in order to lower the viscosity of the resin composition (I), a bifunctional epoxy resin which is liquid at ordinary temperature is desired. From the viewpoint that the crosslinking density of a cured material is not so increased, it is desired that at least one of bisphenol A type epoxy resin and bisphenol F type epoxy resin is added to the epoxy resin (A).

It is desired that the epoxy equivalent of the epoxy resin (A) is not more than 3000, preferably not more than 2500. When the epoxy equivalent is too large, there are tendencies that the viscosity of the obtained resin composition (I) becomes high and that the glass transition temperature and mechanical strength of the cured material obtained from the resin composition (I) are lowered.

The number of a recurring unit of the epoxy resin (A) is not particularly limited. From the viewpoint that the glass transition temperature and elastic modulus of the cured material are sufficiently restrained from being lowered, it is preferable that each of n, y, z and s, which shows the number of a recurring unit of the epoxy resins (A-1), (A-2), (A-3) and (A-4), is, for instance, about 0 to about 2.

The acid anhydride (B) forms a crosslinking network structure together with the epoxy resin (A). The acid anhydride (B) imparts excellent electrical properties and mechanical properties to the cured material obtained from the resin composition (I).

As typical examples of the acid anhydride (B), there are cited, for instance, phthalic acid anhydrides such as methyltetrahydrophthalic acid anhydride, methylhexahydroxyphthalic acid anhydride, hexahydrophthalic acid anhydride, tetrahydrophthalic acid anhydride, trialkyltetrahydrophthalic acid anhydride, tetrabromophthalic acid anhydride and phthalic acid anhydride; methylnadic acid anhydride; trimellitic acid anhydride; pyromellitic acid anhydride; benzophenonetetracarboxylic acid anhydride; dodecenylsuccinic acid anhydride; poly(ethyloctadecanedioic acid) anhydride and the like, and these can be used alone or in an admixture thereof. Among these acid anhydrides (B), methyltetrahydrophthalic acid anhydride, methylnadic acid anhydride and the like are preferable from the viewpoint that the viscosity of an obtained resin composition (I) is lowered at ordinary temperature and the glass transition temperature of the cured material obtained from the resin composition (I) becomes relatively high. Also, in order to lower the viscosity of the mixture obtained by mixing the acid anhydride (B) with the epoxy resin (A), an acid anhydride which is liquid at ordinary temperature is desired as the acid anhydride (B).

The amount of the acid anhydride (B) based on 100 parts by weight of the epoxy resin (A) is represented by the equation:

[Amount of the acid anhydride (B) (parts by weight)]= (Molecular weight of the acid anhydride (B)/Number of acid anhydride groups in one molecule of the acid anhydride (B))×(Number of acid anhydride groups of the acid anhydride (B)/Number of epoxy groups of the epoxy resin (A))×(100/Epoxy equivalent of the epoxy resin (A)).

In the present invention, the ratio of the number of acid anhydride groups of the acid anhydride (B)/the number of epoxy groups of the epoxy resin (A) is adjusted to not more than 1.5, preferably not more than 1.2. When the ratio is too large, the glass transition temperature of the cured material obtained from the resin composition (I) becomes low and the mechanical properties of the cured material are not sufficiently improved. Also, the ratio of the number of acid anhydride groups of the acid anhydride (B)/the number of epoxy groups of the epoxy resin (A) is adjusted to not less than 0.5, preferably not less than 0.7. When the ratio is too small, the weight of the resin composition (I) greatly decreases during heating of the resin composition (I) and the mechanical properties of the cured material obtained from the resin composition (I) are not sufficiently improved.

As typical examples of the curing accelerator (C), there are cited, for instance, imidazoles such as 2-ethyl-4-methylimidazole, 2-methylimidazole and 2-phenylimidazole, and salts thereof; phosphorus compounds such as organophosphorus compounds such as triphenylphosphine, cyclic phosphine, tributylphosphine and tetraphenylphosphonium bromide; amines such as aliphatic amines, aliphatic polyamines, aromatic amines and tertiary amines, and salts thereof; compounds capable of curing epoxy resins such as dicyanodiamide, Lewis acid-base catalyst, Brønsted acids salts, organometallic salts such as zinc octoate and stannous octoate, polymercaptanes, micro capsule catalysts and the like, and these can be used alone or in an admixture thereof. Among them, 2-ethyl-4-methylimidazole is preferable from the viewpoint of easiness in handling and great reactivity.

The amount of the curing accelerator (C) is adjusted to not more than 10 parts by weight, preferably not more than 6 parts by weight based on 100 parts by weight of the epoxy resin (A). When the amount is too large, the mechanical strength of the cured material obtained from the resin composition (I) is lowered because the reaction heat of the resin composition (I) is increased during the curing of the resin comopsition (I) and the curing reaction proceeds partially, instantly and unevenly. Also, the amount of the curing accelerator (C) is adjusted to not less than 0.05 part by weight, preferably not less than 0.1 part by weight based on 100 parts by weight of the epoxy resin (A). When the amount is too small, the reaction rate of the resin composition (I) is lowered and the curing reaction time of the resin composition becomes excessively longer.

The coupling agent (D) is at least one coupling agent selected from the group consisting of epoxysilane type coupling agents, phenylaminosilane type coupling agents, mercaptosilane type coupling agents and titanate type coupling agents.

As typical examples of the epoxysilane type coupling agents, for instance, γ-glycidoxypropyl-trimethoxysilane and the like are cited. As typical examples of the phenylaminosilane type coupling agents, for instance, N-phenyl-γ-aminopropyltrimethoxysilane and the like are cited. As typical examples of the mercaptosilane type coupling agents, for instance, γ-mercaptopropyltrimethoxysilane and the like are cited. As typical examples of the titanate type coupling agents, for instance, isopropyltriisostearoyl titanate, isopropyltri(dioctyl phosphate) titanate and the like are cited. Among these coupling agents, epoxysilane type coupling agents such as γ-glycidoxypropyltrimethylsilane and titanate type coupling agents are preferable from the viewpoint of avoiding the increase of the viscosity of the resin composition (I) to give a cured material having a high mechanical strength.

The amount of the coupling agent (D) is determined in consideration of the amount of the following filler (E). The amount of the coupling agent (D) is adjusted to not more than 5 parts by weight, preferably not more than 3 parts by weight based on 100 parts by weight of the filler (E). When the amount is too large, thermal resistance of the cured material obtained from the resin composition (I) is lowered. Also, the amount of the coupling agent (D) is adjusted to not less than 0.05 part by weight, preferably not less than 0.1 part by weight based on 100 parts by weight of the filler (E). When the amount is too small, the mechanical strength of the cured material obtained from the resin composition (I) is not more sufficiently improved in comparison with the mechanical strength of the cured material obtained from a resin composition not containing the coupling agent (D).

The filler (E) comprises at least one of silica fillers and alumina fillers. The silica fillers can be natural silica or synthetic silica. As the silica fillers, for instance, fused silica, crystal silica and the like are cited. Also, as the alumina fillers, for instance, alumina with low sodium concentration, alumina for easy sintering and the like are cited.

The average particle diameter of the filler (E) is not more than 60 μm. It is preferable that the average particle diameter is not more than 40 μm from the viewpoint that the mechanical strength of the cured material obtained from the resin composition (I) is hardly lowered. Also, it is desired that the average particle diameter of the filler (E) is not less than about 0.05 μm, preferably not less than about 1 μm. When the average particle diameter is too small, there is a tendency that the viscosity of the resin composition (I) becomes higher. Also, it is desired that the maximum particle diameter of the filler (E) is not more than 400 μm, preferably not more than 200 μm so as to penetrate the resin composition (I) into the tight gap of the apparatus for high voltage comprising the inserted material.

Furthermore, the content of particles having a diameter of not more than 5 μm in the filler (E) is adjusted to not less than 5% by weight, preferably not less than 10% by weight in order to avoid the increase of the viscosity of the resin composition (I) and give a cured material having a high density by making the distribution of the particle size wide.

In the present invention, the shape of the filler (E) can be, for instance, spherical or angular, and is not particularly limited.

The content of the filler (E) is adjusted to not more than 95% by weight, preferably not more than 85% by weight in the resin composition (I). When the content is too large, it is difficult to mold the resin composition (I) and increase the elastic modulus of the obtained cured material because the viscosity of the resin composition (I) becomes higher. Also, the content of the filler (E) is adjusted to not less than 35% by weight, preferably not less than 40% by weight in the resin composition (I). When the content is too small, the obtained resin composition (I) is unsuitable for materials for molding because the elastic modulus of an obtained cured material becomes lower and the cured material becomes soft, so that the mechanical strength of the cured material is lowered.

When both the silica filler and the alumina filler are used together, the mixing ratio thereof is not particularly limited and can be properly adjusted.

The epoxy resin composition for molding (I) of the present invention contains the epoxy resin (A), the acid anhydride (B), the curing accelerator (C), the coupling agent (D) and the filler (E) as main components. In the present invention, for instance, the following components can be contained in the above-mentioned components as occasion demands.

For instance, in order to further improve the fracture toughness of the resin composition (I), restrain the generation of stress in a molded product obtained from the resin composition (I) and further improve crack resistance, productivity, formability and the like, it is preferable that the resin composition (I) contains fine particles (F) having an average particle diameter of not more than 100 µm, made of a thermoplastic polymer showing compatibility with the epoxy resin (A) and having a recurring unit represented by the general formula (V):

not less than 5 parts by weight based on 100 parts by weight of all of the organic components. When the amount is too small, there is a tendency that effects shown by using the fine particles (F) are not sufficiently exhibited.

In order to exhibit the same effects as the fine particles (F), it is preferable that the resin composition (I) contains a thermoplastic polymer (G) showing compatibility with the epoxy resin (A) and having hydroxyl groups on both ends of its molecular chain, represented by the general formula (VI):

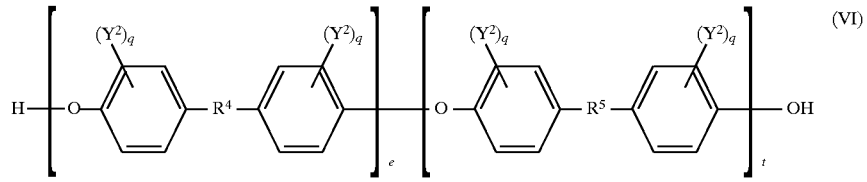

wherein each of $Y^2$ is independently hydrogen atom or a halogen atom, $R^4$ is —$SO_2$— or —O—, $R^5$ is —$CH_2$—, —$C(CH_3)_2$—, —$CF_2$— or —$C(CF_3)_2$—, each of q is independently an integer of 1 to 4, the average of e is 0 to 50, the average of t is 0 to 50, the average of e+t is 1 to 50, in which the sequence of a recurring unit represented by the general formula:

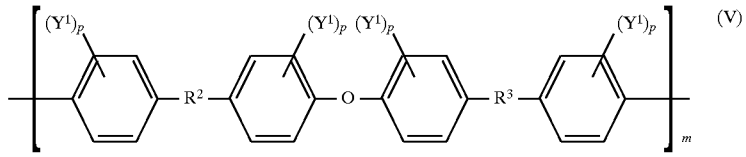

wherein each of $Y^1$ is independently hydrogen atom or a halogen atom, each of $R^2$ and $R^3$ is independently —$SO_2$—, —O—, —$CH_2$—, —$C(CH_3)_2$—, —$CF_2$— or —$C(CF_3)_2$—, each of p is independently an integer of 1 to 4 and the average of m is 50 to 200.

In the general formula (V), examples of the halogen atom used as $Y^1$ are fluorine atom, chlorine atom, bromine atom and iodine atom. It is preferable that the average of m is 80 to 100.

The number average molecular weight of the thermoplatic polymer is not particularly limited. It is preferable that the number average molecular weight of the thermoplastic polymer is usually about 20000 to about 50000.

It is preferable that the average particle diameter of the fine particles (F) of the thermoplastic polymer is not more than 100 µm. From the viewpoint that the compatibility of the fine particles (F) with the expoy resin (A) and the mechanical properties of the cured material obtained from the resin composition (I), it is more preferable that the average particle diameter of the fine particles (F) is not more than 50 µm.

It is desired that the amount of the fine particles (F) is not more than 50 parts by weight, preferably not more than 30 parts by weight based on 100 parts by weight of all of the organic components constituting the resin composition (I) other than the filler (E). When the amount is too large, there is a tendency that the viscosity of the resin composition (I) greatly increases. Also, it is desired that the amount of the fine particles (F) is not less than 3 parts by weight, preferably

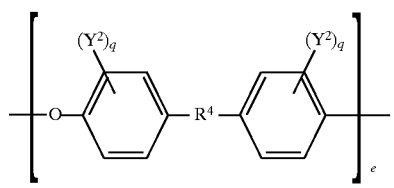

and a recurring unit represented by the general formula:

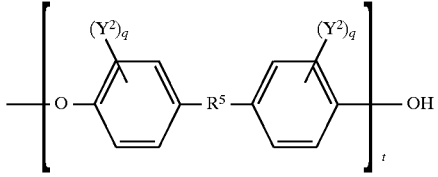

is at random or in block.

In the general formula (VI), examples of the halogen atom used as $Y^2$ are fluorine atom, chlorine atom, bromine atom and iodine atom. It is preferable that the average of e is 0 to 20, the average of t is 0 to 20 and the average of e+t is 1 to 40.

The number average molecular weight of the thermoplastic polymer (G) is not particularly limited. It is preferable that the number average molecular weight of the thermoplatic polymer (G) is usually about 3000 to about 20000.

It is desired that the amount of the thermoplatic polymer (G) is not more than 30 parts by weight, preferably not more than 15 parts by weight based on 100 parts by weight of all of the organic components constituting the resin composition (I) other than the filler (E). When the amount is too large, there is a tendency that the viscosity of the resin composition (I) becomes higher. Also, it is desired that the amount of the thermoplastic polymer (G) is not less than 3 parts by weight, preferably not less than 5 parts by weight based on 100 parts by weight of all of the organic components. When the amount is too small, there is a tendency that effects shown by using the thermoplastic polymer (G) are not sufficiently exhibited.

The hydroxyl groups of the thermoplastic polymer (G) are reacted with the epoxy groups of the epoxy resin (A) during the curing reaction of the resin composition (I). The thermoplastic polymer (G) can be previously reacted with the epoxy resin (A), and can be added to the components for the resin composition (I) at any stage during the preparation of the resin composition (I).

In order to exhibit the same effects as the fine particles (F), it is preferable that the resin composition (I) contains at least one of a polysiloxane (H) having a functional group capable of reacting with the epoxy resin (A) or the acid anhydride (B) and fine particles (I) of a silicone polymer having a skeleton of siloxane.

The functional group of the polysiloxane (H) capable of reacting with the epoxy resin (A) or the acid anhydride (B) is, for instance, epoxy group, amino group, phenolic hydroxyl group, carboxyl group or the like. The functional group of the polysiloxane (H) can be included in any of both ends, one end and its side chain. It is preferable that the number of the functional group is, on the average, about 1 to about 10 in one molecule of the polysiloxane (H). The polysiloxane (H) having about 3 functional groups in its molecule is preferable from the viewpoint that the polysiloxane (H) can be dispersed without gelation during the reaction of the resin composition (I).

The number average molecular weight of the polysiloxane (H) is not particularly limited. It is preferable that the number average molecular weight of the polysiloxane (H) is usually about 300 to about 5000.

As typical examples of the silicone polymer having a skeleton of siloxane, there are cited, for instance, rubber-like crosslinked polymers such as methyl-3,3,3-trifluoropropylsiloxane-methylvinylsiloxane copolymer, dimethylsiloxane-methylvinylsiloxane copolymer, dimethylsiloxane-diphenylsiloxane-methylvinylsiloxane terpolymer, silicone polymer having methacryloxypropyl group and the like, and these can be used alone or in an admixture thereof.

It is desired that the average particle diameter of the fine particles (I) is not more than 100 μm, preferably not more than 50 μm. When the average particle diameter is too large, there is a tendency that the mechanical strength of the cured material obtained from the resin composition (I) is extremely lowered.

It is desired that the amount of at least one of the polysiloxane (H) and the fine particles (I) is not more than 20 parts by weight, preferably not more than 15 parts by weight based on 100 parts by weight of all of the organic components constituting the resin composition (I) other than the filler (E). When the amount is too large, there is a tendency that the mechanical strength of the cured material obtained from the resin composition (I) is lowered. Also, it is desired that the amount of at least one of the polysiloxane (H) and the fine particles (I) is not less than 3 parts by weight, preferably not less than 5 parts by weight based on 100 parts by weight of all of the organic components. When the amount is too small, there is a tendency that effects shown by using at least one of the polysiloxane (H) and the fine particles (I) are not sufficiently exhibited.

The functional groups of the polysiloxane (H) are reacted with the epoxy groups of the epoxy resin (A) or the acid anhydride groups of the acid anhydride (B) during the curing reaction of the resin composition (I). The polysiloxane (H) can be previously reacted with the epoxy resin (A) or the acid anhydride (B), and added to the components for the resin composition (I) at any stage during the preparation of the resin composition (I).

In order to exhibit the same effects as the fine particles (F), it is preferable that the resin composition (I) contains a polymer (J) showing compatibility with the epoxy resin (A) and having hydroxyl groups on both ends of its molecular chain, represented by the general formula (VII):

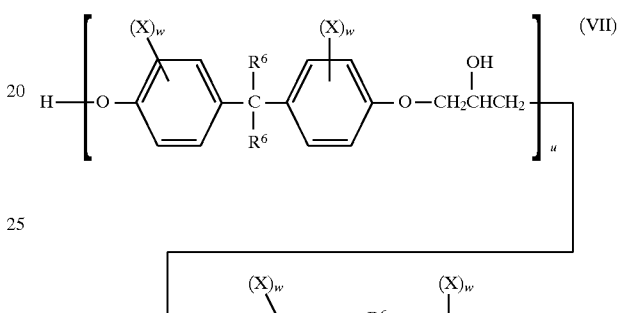

wherein each of $R^6$ is independently hydrogen atom or an alkyl group, each of X is independently hydrogen atom or bromine atom, each of w is independently an integer of 1 to 4 and the average of u is 0 to 300.

In the general formula (VII), it is preferable that the carbon number of the alkyl group of $R^6$ is 1 to 10 and the average of u is 0 to 50.

The number average molecular weight of the polymer (J) is not particularly limited. It is generally preferable that the number average molecular weight of the polymer (J) is about 500 to about 30000.

It is desired that the amount of the polymer (J) is not more than 30 parts by weight, preferably not more than 20 parts by weight based on 100 parts by weight of all of the organic components constituting the resin composition (I) other than the filler (E). When the amount is too large, there is a tendency that the viscosity of the resin composition (I) becomes higher. Also, it is desired that the amount of the polymer (J) is not less than 3 parts by weight, preferably not less than 5 parts by weight based on 100 parts by weight of all of the the organic components. When the amount is too small, there is a tendency that effects shown by using the polymer (J) are not sufficiently exhibited.

The hydroxyl groups of the polymer (J) are reacted with the epoxy groups of the epoxy resin (A) during the curing reaction of the resin composition (I). The polymer (J) can be previously reacted with the epoxy resin (A), and added to the components for the resin composition (I) at any stage during the preparation of the resin composition (I).

In order to exhibit the same effects as the fine particles (F), it is preferable that the resin composition (I) contains a butadiene-acrylonitrile copolymer (K) having carboxyl group or amino group on an end of its molecular chain.

The carboxyl group or amino group of the butadiene-acrylonitrile copolymer (K) can be included in any of both ends and one of its molecular chain. Particularly, a butadiene-acrylonitrile copolymer (K) having carboxyl groups on both ends of its molecular chain is preferable.

The number average molecular weight of the butadiene-acrylonitrile copolymer (K) is not particularly limited. It is preferable that the number average molecular weight of the butadiene-acrylonitrile copolymer (K) is usually about 500 to about 30000.

It is desired that the amount of the butadiene-acrylonitrile copolymer (K) is not more than 30 parts by weight, preferably not more than 20 parts by weight based on 100 parts by weight of all of the organic components constituting the resin composition (I) other than the filler (E). When the amount is too large, there is a tendency that the mechanical strength of the cured material obtained from the resin composition (I) is lowered. Also, it is desired that the amount of the butadiene-acrylonitrile copolymer (K) is not less than 3 parts by weight, preferably not less than 5 parts by weight based on 100 parts by weight of all of the organic components. When the amount is too small, there is a tendency that effects shown by using the butadiene-acrylonitirle copolymer (K) are not sufficiently exhibited.

In order to exhibit the same effects as the butadiene-acrylonitirle copolymer (K), it is preferable that the resin composition (I) contains at least one of a hydrogenated polybutadiene and a hydrogenated polyisoprene (L) (hereinafter referred to as hydrogenated polymer (L)) having a functional group capable of reacting with the epoxy resin (A) or the acid anhydride (B).

The functional group of the hydrogenated polymer (L), capable of reacting with the epoxy resin (A) or the acid anhydride (B) is, for instance, epoxy group, carboxyl group, hydroxyl group or the like. The functional group of the hydrogenated polymer (L) can be included in any of both ends, one end and its side chain. It is preferable that the number of the functional group is, on the average, about 1 to about 10 in one molecule of the hydrogenated polymer (L). Particularly, a hydrogenated polymer (L) having the epoxy groups on both ends of its molecular chain is preferable.

The number average molecular weight of the hydrogenated polymer (L) is not particularly limited. It is preferable that the number average molecular weight of the hydrogenated polymer (L) is usually about 500 to about 50000.

It is desired that the amount of the hydrogenated polymer (L) is not more than 30 parts by weight, preferably not more than 20 parts by weight based on 100 parts by weight of all of the organic components constituting the resin composition (I) other than the filler (E). When the amount is too large, there is a tendency that the mechanical strength of the cured material obtained from the resin composition (I) is lowered. Also, it is desired that the amount of the hydrogenated polymer (L) is not less than 3 parts by weight, preferably not less than 5 parts by weight based on 100 parts by weight of all of the organic components. When the amount is too small, there is a tendency that effects shown by using the hydrogenated polymer (L) are not sufficiently exhibited.

The functional groups of the hydrogenated polymer (L) are reacted with the epoxy groups of the epoxy resin (A) or the acid anhydride groups of the acid anhydride (B) during the curing reaction of the resin composition (I). The hydrogenated polymer (L) can be previously reacted with the epoxy resin (A) or the acid anhydride (B), and added to the components for the resin composition (I) at any stage during the preparation of the resin composition (I).

In order to exhibit the same effects as the fine particles (F), it is preferable that the resin composition (I) contains at least one compound (M) selected from maleimide, poly(ether imide) and polyphenyl ether.

The number average molecular weight of the poly(ether imide) is not particularly limited. It is generally preferable that the number average molecular weight of the poly(ether imide) is about 3000 to about 20000. Also, the number average molecular weight of the polyphenylene ether is also not particularly limited. It is preferable that the number average molecular weight of the polyphenylene ether is usually about 10000 to about 100000.

It is desired that the amount of the compound (M) is not more than 30 parts by weight, preferably not more than 20 parts by weight based on 100 parts by weight of all of the organic components constituting the resin composition (I) other than the filler (E). When the amount is too large, there is a tendency that the viscosity of the resin composition (I) becomes higher. Also, it is desired that the amount of the compound (M) is not less than 3 parts by weight, preferably not less than 5 parts by weight based on 100 parts by weight of all of the organic components. When the amount is too small, there is a tendency that effects shown by using the compound (M) are not sufficiently exhibited.

When a compound having a functional group capable of reacting with the epoxy resin (A) or the acid anhydride (B), such as the polysiloxane (H) or the hydrogenated polymer (L), is used during the preparation of the resin composition (I), it is preferable that the mixing ratio of the epoxy resin (A) to the acid anhydride (B) is adjusted so as to be within the above-mentioned range and the amount of the compound having a functional group capable of reacting with the epoxy resin (A) or the acid anhydride (B) is adjusted so as to be within the above-mentioned range.

In order to improve the fracture toughness and mechanical strength of the cured material obtained from the resin composition (I) and to more improve the crack resistance of the cured material, it is desired that filaments having an average length of not less than 50 $\mu$m are added to the resin composition (I).

As the filaments, for instance, inorganic filaments such as glass filament and alumina filament, and the like are cited, and the present invention is not limited to the exemplified ones.

It is preferable that the average length of the filaments is not less than 50 $\mu$m. From the viewpoint of more improving the mechanical strength and fracture toughness of the cured material obtained from the resin composition (I), it is more preferable that the average length of the filaments is not less than 100 $\mu$m. Also, it is desired that the average length of the filaments is not more than 5000 $\mu$m, preferably not more than 2000 $\mu$m. When the average length is too long, there is a tendency that the viscosity of the resin composition (I) becomes higher.

It is desired that the amount of the filaments is not less than 3% by weight, preferably not less than 5% by weight of the resin composition (I). When the amount is too small, there is a tendency that effects shown by using the filaments are not sufficiently exhibited. Also, it is desired that the amount of the filaments is not more than 30% by weight, preferably not more than 20% by weight of the resin composition (I). When the amount is too large, there is a tendency that the viscosity of the resin composition (I) becomes higher.

In the resin composition (I), there can be properly contained additives which are generally used in a resin composition employed for the production of a molded product, such as flame retardants such as antimony compounds such as antimony trioxide and phosphorus compounds; antioxidants; and coloring agents such as carbon black.

A process for preparing the resin composition (I) is not particularly limited. For instance, each of the components for the resin composition (I) is mixed together by means of an ordinary mixer and the resulting mixture is defoamed under vacuum to give the resin composition (I).

The resin composition (I) can be naturally cured at ordinary temperature. When accelerating the curing reaction of the resin composition (I), for instance, the resin composition (I) can be heated to about 80° to about 200° C. for about 30 seconds to about 20 hours.

The cured material obtained from the epoxy resin composition for molding (I) has a high glass transition temperature of about 140° to about 170° C., excellent mechanical properties such as high mechanical strength and high toughness and excellent thermal resistance. Therefore, it is possible to produce a molded product used for apparatus for high voltage having excellent crack resistance and high reliability from the resin composition (I).

In a process for preparing a molded product used for apparatus for high voltage of the present invention, at first, the curing accelerator (C) is mixed with a mixture comprising the components for the resin composition (I) not containing the curing accelerator (C) to prepare a resin composition (I). It is preferable that the amount of the curing accelerator (C) is not less than 3 parts by weight based on 100 parts by weight of the epoxy resin (A) from the viewpoint that the curing time of the resin composition (I) can be shortened.

Then, before the resin composition (I) is cured, the resin composition (I) is injected into a metal mold having a desirable shape under a prescribed pressure and molded to give a cured material. The obtained cured material is aged to give a desirable molded product.

The metal mold is heated in order to accelerate the curing reaction of the resin composition (I) which is injected into the metal mold. When the mold is heated, the temperature in the metal mold is not particularly limited. It is desired that the temperature in the metal mold is not more than about 200° C., preferably not more than about 180° C. When the temperature is too high, there is a tendency that discoloration of the resin composition (I) is generated during its molding. Also, it is desired that the temperature in the metal mold is not less than about 80° C., preferably not less than about 100° C. When the temperature is too low, there is a tendency that the curing time of the resin composition (I) is not shortened and work efficiency during molding of the resin composition (I) is not improved because the crosslinking density becomes low, thereby the cured resin composition (I) has low mechanical strength.

The resin composition (I) is injected into the metal mold under a pressure of not more than 100 kg/cm$^2$, preferably not more than 80 kg/cm$^2$. When the resin composition (I) is injected into the metal mold under a so high pressure, in the case that the metal mold is provided with an inserted material or a fiber sheet, there is a possibility that the inserted material and the fiber sheet are deformed. Also, the resin composition (I) is injected into the metal mold under a pressure of not less than 5 kg/cm$^2$, preferably not less than 20 kg/cm$^2$. When the resin composition (I) is injected into the metal mold under a so low pressure, there is a possibility that it takes a long period of time to inject the resin composition (I) into the metal mold and the curing reaction of the resin composition (I) unevenly progresses.

When the resin composition (I) which is injected into the metal mold is molded at a high speed, in order to lower the viscosity of the resin composition (I) and cure the resin composition (I) at a higher speed, the curing accelerator (C) can be mixed with a mixture comprising the components for the resin composition (I) not containing the curing accelerator (C) with heating to about 40° to about 80° C. Also, the conditions such as temeprature and period of time for aging the obtained molded product after molding are not particularly limited and can be properly adjusted.

An apparatus used for the production of the molded product is not particularly limited. As the apparatus, for instance, a curing accelerator separation-type high speed molding apparatus in which the resin composition (I) can be molded at a high speed, and the like may be used.

FIG. 1 is a schematic illustrative drawing showing one embodiment of a process for preparing a molded product of the present invention.

In FIG. 1, 1 denotes a curing accelerator separation-type high speed molding apparatus. The curing accelerator separation-type high speed molding apparatus 1 (hereinafter also referred to as molding apparatus 1) is charged with the curing accelerator (C) through a supply port 2 of the molding apparatus 1 and with the mixture comprising the components for the resin composition (I) not containing the curing accelerator (C) through a supply port 3, respectively. The curing accelerator (C) is mixed with the mixture and they are heated from room temperature to about 80° C. in a mixer 4 to give a resin composition (I). Then, the resin composition (I) is injected into a metal mold 5 through an injection nozzle 6 of the metal mold 5 and molded to give a desirable molded product at a high speed. Also, the resin composition (I) mixed in the mixer 4 is injected into the metal mold under prescribed conditions in accordance with, for instance, a transfer molding method, an injection molding method or the like, and is molded to give a desired molded product at a high speed.

In the present invention, a molded product used for apparatus for high voltage which is provided with an inserted material, such as, for instance, a stator of a molded motor, a coil of a molded motor or a molded transformer can be obtained from the epoxy resin composition for molding (I).

The molded product can be of course produced in accordance with the process described in the schematic illustrative drawing shown in FIG. 1. For instance, a metal mold shown in FIG. 2 can be used as the metal mold 5 shown in FIG. 1.

Figure 2:
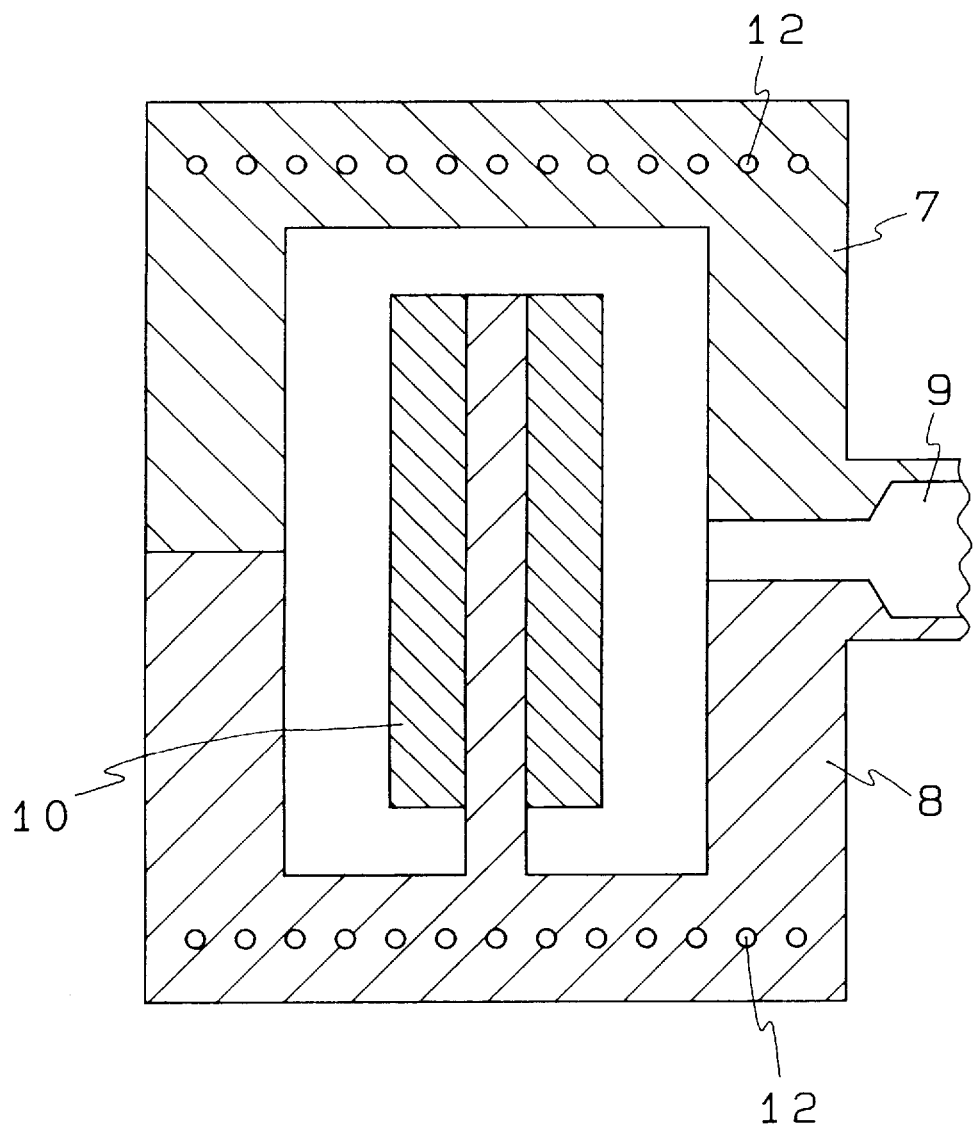
FIG. 2 is a schematic illustrative drawing of a metal mold which can be used in the process for preparing a molded product used for apparatus for high voltage of the present invention.

FIG. 2 is a schematic illustrative drawing of a metal mold which can be used in the process for preparing a molded product of the present invention. In FIG. 2, an upper mold 7 and a lower mold 8 are provided with an inserted material 10 and they are closed. The curing accelerator (C) is mixed with the mixture comprising the components for the resin composition (I) not containing the curing accelerator (C) to give a resin composition (I). The resin composition (I) is injected into a metal mold through an injection nozzle 9 under pressure before the resin composition (I) is cured. The resin composition (I) is molded to give a molded product which is provided with an inserted material.

In the present invention, a molded product used for apparatus for high voltage, which is provided with an inserted material can be obtained from an epoxy resin composition for molding (II) (hereinafter also referred to as resin composition (II)) and a fiber sheet.

As the epoxy resin composition for molding (II) used for the production of a molded product which is provided with the fiber sheet, there can be used a resin composition comprising the epoxy resin (A), the acid anhydride (B), the curing accelerator (C) and the coupling agent (D). The mixing ratio of the acid anhydride (B) to the epoxy resin (A)

and that of the curing accelerator (C) to the epoxy resin (A) may be the same ratio as in the resin composition (I). It is desired that the content of the coupling agent (D) is not more than 5% by weight, preferably not more than 3% by weight in the resin composition (II). When the content is too large, there is a tendency that thermal resistance of a cured material obtained from the resin composition (II) is lowered. Also, it is desired that the content of the coupling agent (D) is not less than 0.01% by weight, preferably not less than 0.1% by weight in the resin composition (II). When the content is too small, there is a tendency that the mechanical strength of the cured material obtained from the resin composition (II) is not sufficiently improved in comparison with mechanical strength of a cured material obtained from a resin composition not containing the coupling agent (D). Also, the resin composition (II) can contain the filler (E) and the other optional components such as the fine particles (F) and the thermoplastic polymer (G) within about the same amount as in the epoxy resin composition for molding (I).

For instance, the molded product which is provided with a fiber sheet can be produced in accordance with the process described in the schematic illustrative drawing shown in FIG. 1. Also, a metal mold shown in FIG. 3 can be used as the metal mold 5 shown in FIG. 1.

Figure 3:
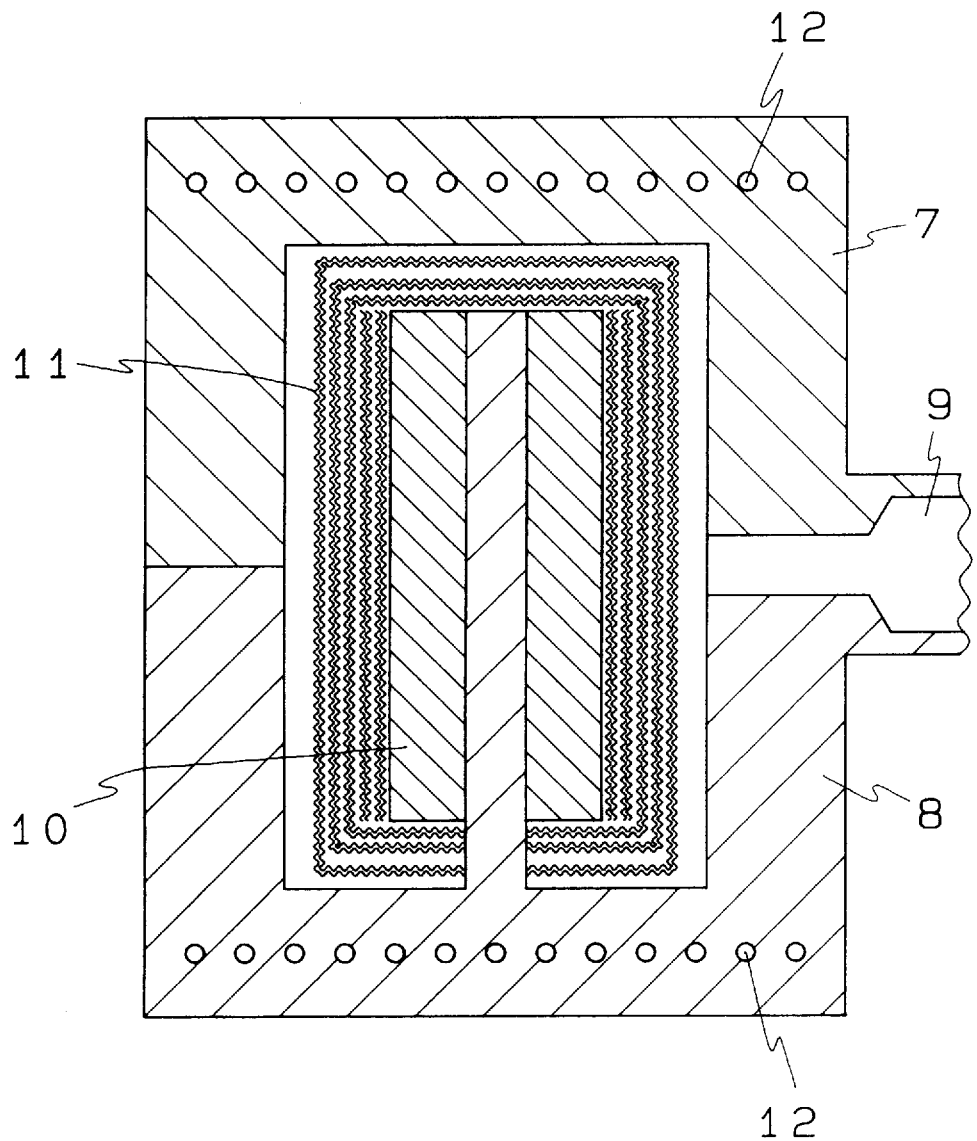
FIG. 3 is a schematic illustrative drawing of a metal mold which can be used in the process for preparing a molded product used for apparatus for high voltage of the present invention.

FIG. 3 is a schematic illustrative drawing of a metal mold which can be used in the process for preparing a molded product of the present invention. In FIG. 3, an upper mold 7 and a lower mold 8 are provided with an inserted material 10 and are closed. The inserted material 10 is covered with a fiber sheet 11. The curing accelerator (C) is mixed with the mixture comprising the components for the resin composition (II) not containing the curing accelerator (C) to give a resin composition (II). The resin composition (II) is injected into a metal mold through an injection nozzle 9 under pressure before the resin composition (II) is cured. The resin composition (II) is molded to give a molded product which is provided with an inserted material covered with a fiber sheet.

In the present invention, when producing a molded product which is provided with an inserted material, in order to accelerate the curing reaction of the resin composition (I) or the resin composition (II), the curing accelerator (C) is mixed with the mixture comprising the components for the resin composition (I) or the resin composition (II) not containing the curing accelerator (C), and they can be heated to, for instance, about 40° to about 80° C., or a metal mold can be properly heated. As shown in FIG. 2 and FIG. 3, the metal mold can be heated by means of a heater 12 provided in the metal mold. When the metal mold is heated, it is preferable that the temperature in the metal mold is about 80° to about 200° C. from the viewpoint that the resin composition (I) or (II) can be molded at a high speed and the obtained molded material can be prevented from discoloration.

As the fiber sheet, which is used as one of constituents of the inserted material, for instance, various sheets of fibers such as glass fiber and alumina fiber, and the like can be used. Also, the form of the fiber sheet is not particularly limited. As the form of the fiber sheet, for instance, web, woven fabric, non-woven fabric and the like are cited. Moreover, the thickness of the fiber sheet is not also particularly limited and may be properly adjusted in accordance with the objects and uses of the present invention. In the present invention, it is generally preferable that all of the surfaces of the inserted material are covered with the fiber sheet. Also, the surface of the inserted material may be partially covered with the fiber sheet in accordance with the objects and uses of the present invention.

Moreover, a material of the inserted material is not particularly limited. For instance, materials such as iron, copper and aluminum, which are generally used in a molded product, can be cited as the material of the inserted material.

When a molded product which is provided with the inserted material is produced, it is desired that the resin composition (I) or the resin composition (II) is injected into the metal mold under a pressure of not more than 100 kg/cm², preferably not more than 80 kg/cm². When the resin composition (I) or (II) is injected into the metal mold under a so high pressure, there is a tendency that the inserted material may be possibly deformed. Also, it is desired that the resin composition (I) or (II) is injected into the metal mold under a pressure of not less than 5 kg/cm², preferably not less than 20 kg/cm². When the resin composition (I) or (II) is injected into the metal mold under a so low pressure, there is a tendency that it takes a long period of time to inject the resin composition (I) or (II) into the metal mold and the curing reaction of the resin composition (I) or (II) unevenly progresses.

In the process for preparing a molded product of the present invention, as mentioned above, there is used the resin composition of which the cured material has high glass transition temperature and which has excellent mechanical properties and thermal resistance. Therefore, in accordance with the process for preparing a molded product of the present invention, there can be easily produced a molded product used for apparatus for high voltage having excellent crack resistance and high reliability, such as a molded transformer, a molded motor such as a direct-current motor or an alternating-current motor, or a gas insulated apparatus such as a bushing or a spacer.

The present invention is more specifically described and explained by means of the following Examples. It is to be understood that the present invention is not limited to the Examples, and various changes and modifications may be made in the invention without departing from the spirit and scope thereof.

EXAMPLES 1 TO 12 AND COMPARATIVE EXAMPLE 1

The components shown in Table 1 were mixed together by means of a mixer and the resulting mixture was defoamed under vacuum to give a resin composition.

A spacer made of a fluorocarbon resin, having a thickness of 4 mm or a thickness of 6 mm was interposed between two glass plates having a thickness of 5 mm respectively. The obtained resin composition was poured into a space formed between the glass plates, and cured at 120° C. for 4 hours and at 160° C. for 12 hours in a constant temperature bath to produce a test piece having a thickness of 4 mm or a thickness of 6 mm.

As physical properties of the obtained test piece, modulus of flexural elasticity, bending strength, glass transition temperature, coefficient of thermal expansion and value of fracture toughness were measured in accordance with the following methods. The results are shown in Table 2.

(A) Modulus of flexural elasticity

The modulus of flexural elasticity (kg/mm²) of a test piece having a thickness of 4 mm was measured in accordance with the method described in JIS K 6911.

(B) Bending strength

The bending strength (kg/mm²) of a test piece having a thickness of 4 mm was measured in accordance with the method described in JIS K 6911.

(C) Glass transition temperature

Thermal mechanical analysis of a test piece having a thickness of 6 mm was carried out in accordance with a thermal expansion method, and the glass transition temperature (Tg) (°C.) of the test piece was measured.

(D) Coefficient of thermal expansion

During the thermal mechanical analysis of the test piece employed in the above-mentioned item (C), thermal expansion curve was determined. The coefficient of thermal expansion (°C.$^{-1}$) of the test piece was determined from the gradient of a linear part of the glass region (40° to 90° C.) of the thermal expansion curve where its temperature is not more than the Tg.

(E) Value of fracture toughness

Figure 4:
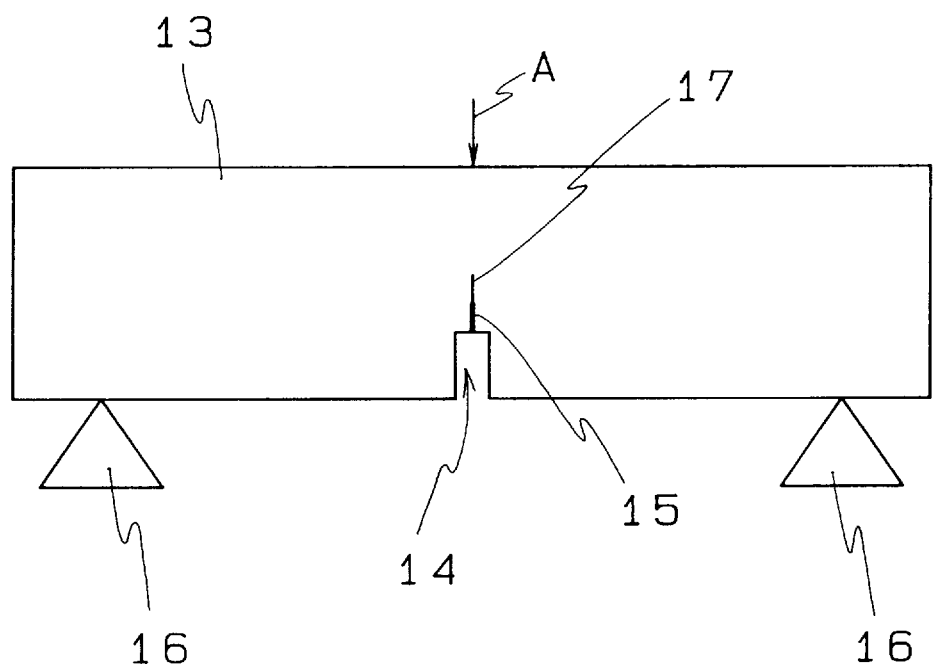
FIG. 4 is a schematic illustrative drawing of a test piece used in measuring the value of fracture toughness in Examples of the present invention and Comparative Examples.

As shown in FIG. 4, a groove 14 having a width of 0.5 mm, a length of 12 mm and a depth of 4.5 mm was carved in the middle of a test piece 13 having a thickness of 6 mm, a length of 12 mm and a width of 80 mm. Then, a kerf 15 having a width of 0.1 mm, a length of 12 mm and a depth of 1.5 mm was carved on the groove 14 to give a test piece for measuring fracture toughness. The test piece was put on two supporting points 16 which had a distance of 15 mm from the end of the test piece respectively. A load was applied to the place where the groove 14 was on the opposite side from the direction of an arrow A. The value of fracture toughness of the test piece ($K_{IC}$) (N/mm$^{3/2}$) was determined by measuring a load when a crack 17 was generated.

Also, crack index and crack characteristics of the resin composition were examined in accordance with the following methods. The results are shown in Table 2.

(F) Crack index

Figure 5A:
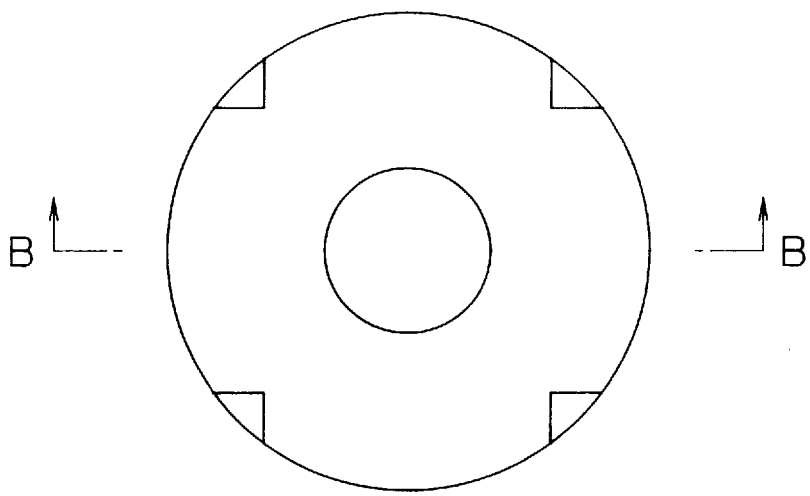
FIG. 5 is a schematic illustrative drawing of a process for preparing a test piece in which an Olyphant-washer which is produced in accordance with the method described in Thermal Shock Test for Casting Resins Proceeding (First National Conference on the Application of Electrical Insulation, Ohio, U.S.A. (1958)) by M. Olyphant Jr. is embedded, which is used in measuring the crack index in Examples of the present invention and Comparative Examples.
Figure 5B:
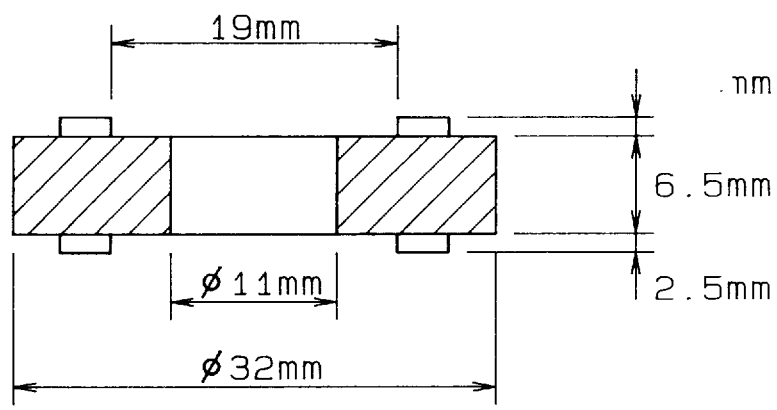

A test piece having a shape shown in FIG. 5, in which an Olyphant-washer was embedded was produced. FIG. 5A is a plan view of the Olyphant-washer and FIG. 5B is a cross section of the Olyphant-washer at a line of B—B shown in FIG. 5A.

Figure 5C:
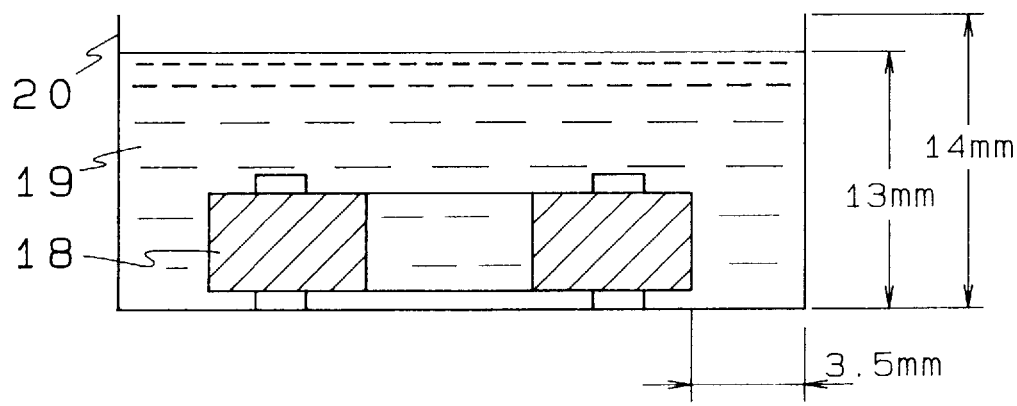

As shown in FIG. 5C, an Olyphant-washer 18 was immersed in a resin composition 19 which was poured into a metal mold 20. Then, the resin composition 19 was cured at 120° C. for 4 hours and at 160° C. for 12 hours to give five test pieces in which the Olyphant-washer was embedded respectively.

The obtained test pieces were exposed to a high temperature (by putting it in an oven for 30 minutes) and a low temperature (by dipping it in dry ice-methanol refrigerant (−60° to −15° C.) for 10 minutes) by turns. The difference between the high temperature and the low temperature was gradually increased under the conditions of an Olyphant-washer test described below. The crack index of the test piece was examined when a crack was generated in the test piece.

| (Olyphant-washer Test) | |
|---|---|
| Crack index | Conditions of Olyphant-washer test when a crack was generated |
| 0 | As it was |
| 1 | 105° C. → 0° C. |
| 2 | 105° C. → 0° C. |
| 3 | 105° C. → 0° C. |
| 4 | 105° C. → −15° C. |
| 5 | 105° C. → −15° C. |
| 6 | 105° C. → −15° C. |
| 7–9 | 105° C. → −30° C. |
| 10–12 | 105° C. → −45° C. |
| 13–15 | 105° C. → −60° C. |
| 16–18 | 120° C. → −60° C. |
| 19–21 | 135° C. → −60° C. |
| 22–24 | 150° C. → −60° C. |

| (Olyphant-washer Test) -continued | |
|---|---|
| Crack index | Conditions of Olyphant-washer test when a crack was generated |
| 25–27 | 165° C. → −60° C. |
| 28–30 | 180° C. → −60° C. |

(G) Crack characteristics

At first, a curing accelerator separation-type high speed molding apparatus 1 shown in FIG. 1 was charged with a curing accelerator (C) through a supply port 2 and with a mixture comprising the components for the resin composition not containing the curing accelerator (C) through a supply port 3, respectively. The curing accelerator (C) and the mixture were mixed together in a mixer 4 to give a resin composition. Then, the resin composition was injected into a metal mold 5 having a shape suitable for a stator of a molded motor, which was heated to 150° C. through a filler hole 6 under a pressure of 40 kg/cm$^2$. The pressure in the metal mold was maintained for 10 minutes and the resin composition was molded. The obtained cured material was aged at 170° C. for about 1 hour to give a molded motor having a shape shown in FIG. 6.

Figure 6:
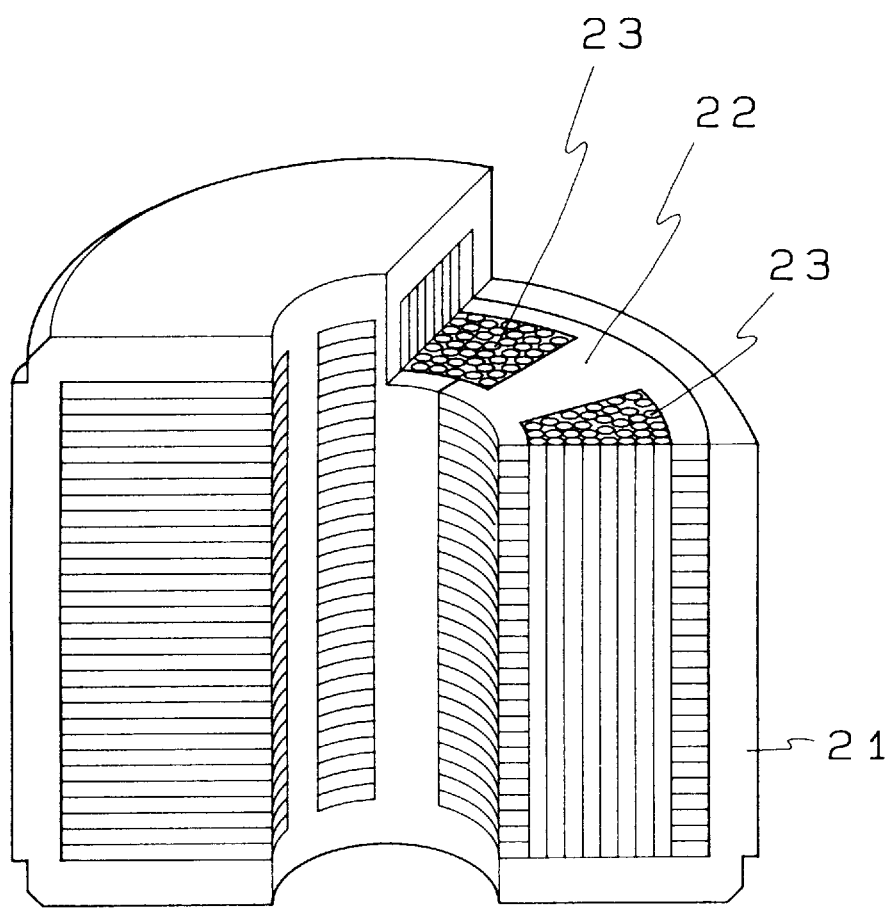
FIG. 6 is a partly sectional schematic illustrative drawing showing one embodiment of a molded motor which is one embodiment of a molded product used for apparatus for high voltage of the present invention.

FIG. 6 is a partly sectional schematic illustrative drawing of a molded motor. In FIG. 6, 21 denotes a stator formed from the resin composition, 22 denotes a stator core and 23 denotes a coil. In order to give a molded motor, fifty steel plates having a thickness of 0.5 mm respectively were laminated with each other and an obtained core was used as the stator core 22. Also, a copper wire covered with polyurethane having a diameter of 0.5 mm was wound up and the obtained coil was used as the coil 23.

Figure 7:
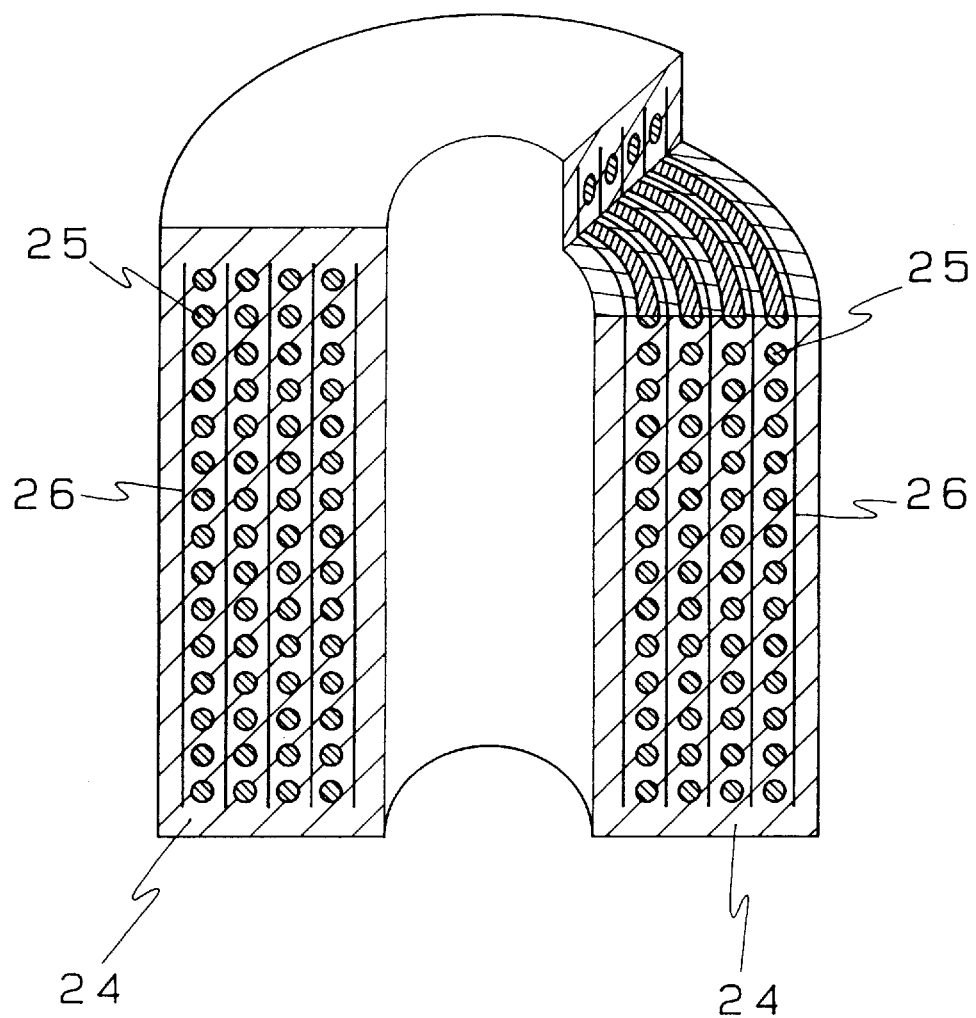
FIG. 7 is a partly sectional schematic illustrative drawing showing one embodiment of a molded transformer which is one embodiment of a molded product used for apparatus for high voltage of the present invention.

Then, a molded transformer having a shape shown in FIG. 7 was produced in the same manner as in the above case of the molded motor by means of the molding apparatus 1 shown in FIG. 1, except that a metal mold having a shape suitable for a coil of the molded transformer was used.

FIG. 7 is a partly sectional schematic illustrative drawing of the molded transformer, having a section in the middle of the molded transformer. In FIG. 7, 24 denotes a coil formed by using the resin composition, 25 denotes a coil-like conductor and 26 denotes a layer insulator. When the molded transformer was produced, an enameled copper wire having a diameter of 2 mm was used as the coil-like conductor 25 and a glass fiber sheet having a thickness of 0.1 mm was used as the layer insulator 26.

The obtained molded motor and the obtained molded transformer were repeatedly subjected to a thermal cycle test comprising cooling the molded motor and the molded transformer at −60° C. for 3 hours and heating the molded motor and the molded transformer at 160° C. for 2 hours 500 times. The generation of cracks on the surface of the molded motor and the molded transformer was observed. In Table 1, ○ shows that no crack was generated at all, Δ shows that cracks were slightly generated, and x shows that cracks were remarkably generated.

In the test of the item (G), the amount of the curing accelerator (C) used in the resin composition was adjusted to 5 parts by weight based on 100 parts by weight of the epoxy resin (A).

Each code shown in Table 1, and the following Tables 3, 5 and 7 is as follows:

(Epoxy resin (A))

A-1: Epoxy resin having an epoxy equivalent of 300 and a number average molecular weight of 580, represented by the formula:

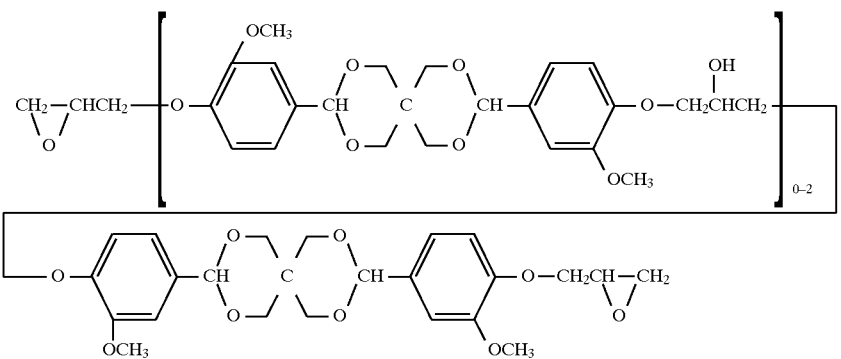
A-21: Epoxy resin having an epoxy equivalent of 650 and a number average molecular weight of 1320, represented by the formula:
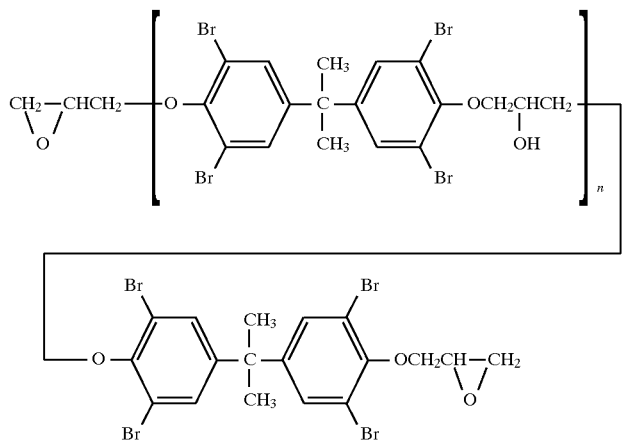
A-22: Epoxy resin having an epoxy equivalent of 550 and a number average molecular weight of 1200, represented by the formula:
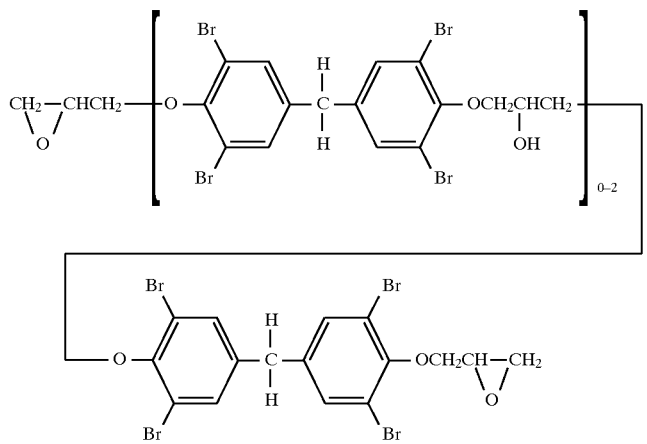
A-3: Epoxy resin having an epoxy equivalent of 220 and a number average molecular weight of 460, represented by the formula:

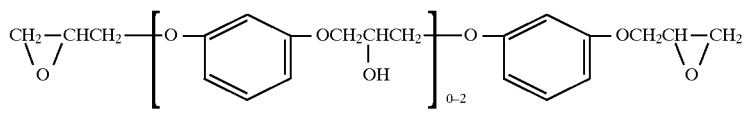

A-4: Epoxy resin having an epoxy equivalent of 280 and a number average molecular weight of 600, represented by the formula:

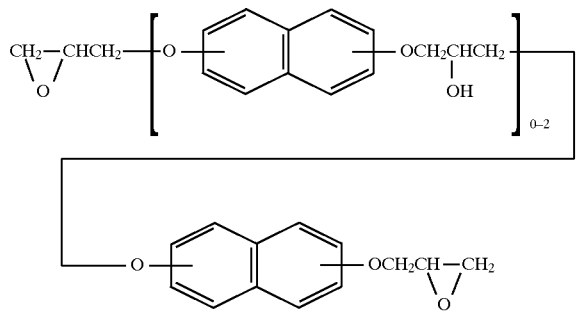

E-807: Bisphenol F type epoxy resin having an epoxy equivalent of 170 and a number average molecular weight of 350 commercially available from Yuka Shell Epoxy Co., Ltd. under the trade name of Epikote 807

E-828: Bisphenol A type epoxy resin having an epoxy equivalent of 190 and a number average molecular weight of 400 commercially available from Yuka Shell Epoxy Co., Ltd. under the trade name of Epikote 828

(Acid anhydride (B))

THPA: Methyl-tetrahydrophthalic acid anhydride having a molecular weight of 166

(Curing accelerator (C))
2E4MZ: 2-Ethyl-4-methylimidazole
(Coupling agent (D))

KBM403: γ-Glycidoxypropyltrimethoxysilane (epoxysilane coupling agent commercially available from Shin-Etsu Chemical Co., Ltd. under the trade name of KBM403)

(Filler (E))

RD-8: Silica filler (fused silica having an average particle diameter of 13 μm and a maximum particle diameter of 130 μm, in which the content of particles having a diameter of not more than 5 μm is 18% by weight, commercially available from Tatsumori Ltd. under the trade name of RD-8)

Also, the number of epoxy groups of the epoxy resin (A) and the number of acid anhydride groups of the acid anhydride (B) are shown in Table 1, and the following Table 3, Table 5 and Table 7. In Examples 1 to 12 and Comparative Example 1 and the following Examples 13 to 32 and Comparative Examples 2 to 5, the ratio of the number of acid anhydride groups of the acid anhydride (B)/the number of epoxy groups of the epoxy resin (A) was adjusted to 0.9. Since epoxy groups were incorporated in H-1 and L-1 which were used in Examples 15 and 20, the ratio of the number of acid anhydride groups of the acid anhydride (B)/the total of the number of epoxy groups of the epoxy resin (A) and the number of epoxy groups of H-1 and L-1 was adjusted to 0.9. Since hydroxyl groups were incorporated in J-1 and J-2 which were used in Examples 17 and 18 and these hydroxyl groups can be reacted with the epoxy groups of the epoxy resin (A), the difference between the number of these hydroxyl groups and the number of epoxy groups of the epoxy resin (A) was calculated, and the ratio of the number of acid anhydride groups of the acid anhydride (B)/the above difference was adjusted to 0.9.

TABLE 1

| | | | | | | Curing accelerator | Coupling agent | Filler (E) |
|---|---|---|---|---|---|---|---|---|
| | Epoxy resin (A) | | | Acid anhydride (B) (THPA) | | | | |
| Ex. No. | Component(s) | (Amount) | Number of epoxy groups[*1] | Amount | Number of acid anhydride groups[*2] | (C)(2E4MZ) (Amount) | (D)(KBM403) (Amount) | (RD-8) (Amount) |
| 1 | A-1 | (100) | 0.333 | 49.8 | 0.300 | 0.3 | 4.6 | 464.2 |
| 2 | A-21 | (100) | 0.154 | 23.0 | 0.139 | 0.3 | 3.8 | 381.3 |
| 3 | A-22 | (100) | 0.182 | 27.1 | 0.163 | 0.3 | 3.9 | 394.0 |
| 4 | A-3 | (100) | 0.455 | 67.9 | 0.409 | 0.3 | 5.2 | 520.2 |
| 5 | A-4 | (100) | 0.357 | 53.4 | 0.322 | 0.3 | 4.8 | 475.4 |
| 6 | A-1 | (50) | 0.167 | 68.8 | 0.414 | 0.3 | 5.2 | 523.0 |
| | E-807 | (50) | 0.294 | | | | | |
| 7 | A-21 | (50) | 0.077 | 55.4 | 0.334 | 0.3 | 4.8 | 481.5 |
| | E-807 | (50) | 0.294 | | | | | |
| 8 | A-22 | (50) | 0.091 | 57.5 | 0.346 | 0.3 | 4.9 | 488.0 |
| | E-807 | (50) | 0.294 | | | | | |
| 9 | A-3 | (50) | 0.227 | 77.9 | 0.469 | 0.3 | 5.5 | 551.1 |
| | E-807 | (50) | 0.294 | | | | | |
| 10 | A-4 | (50) | 0.179 | 70.6 | 0.425 | 0.3 | 5.3 | 528.6 |
| | E-807 | (50) | 0.294 | | | | | |
| 11 | A-1 | (50) | 0.167 | 51.6 | 0.311 | 0.3 | 4.7 | 469.8 |
| | A-4 | (50) | 0.179 | | | | | |

TABLE 1-continued

| | Components (amount: parts by weight) | | | | | | |
|---|---|---|---|---|---|---|---|
| | Epoxy resin (A) | | Acid anhydride (B) (THPA) | | Curing accelerator | Coupling agent | Filler (E) |
| Ex. No. | Component(s) (Amount) | Number of epoxy groups*[1] | Amount | Number of acid anhydride groups*[2] | (C)(2E4MZ) (Amount) | (D)(KBM403) (Amount) | (RD-8) (Amount) |
| 12 | A-21 (50) A-4 (50) | 0.077 0.179 | 38.2 | 0.230 | 0.3 | 4.3 | 428.4 |
| Com. Ex. 1 | E-828 (100) | 0.526 | 78.6 | 0.473 | 0.3 | 5.5 | 553.3 |

(Note)
*[1]Based on the amount of epoxy resin (A) described in Table 1
*[2]Based on the amount of acid anhydride (B) described in Table 1

TABLE 2

| | Physical Properties | | | | | | | |
|---|---|---|---|---|---|---|---|---|
| Ex. No. | Modulus of flexural elasticity (kg/mm$^2$) | Bending strength (kg/mm$^2$) | Glass transition temperature (Tg) (°C.) | Coefficient of thermal expansion (× 10$^{-6}$) (°C.$^{-1}$) | Value of fracture toughness (K$_{IC}$) (N/mm$^{3/2}$) | Crack index | Crack charactistics Molded motor | Molded transformer |
| 1 | 1620 | 14.9 | 148 | 18.5 | 9.6 | 27 | ○ | ○ |
| 2 | 1830 | 16.0 | 170 | 18.2 | 9.3 | ≧30 | ○ | ○ |
| 3 | 1880 | 16.7 | 156 | 18.5 | 9.5 | ≧30 | ○ | ○ |
| 4 | 1600 | 15.2 | 146 | 18.3 | 9.8 | 28 | ○ | ○ |
| 5 | 1560 | 15.3 | 164 | 17.8 | 10.1 | ≧30 | ○ | ○ |
| 6 | 1570 | 14.4 | 144 | 18.4 | 9.2 | 28 | ○ | ○ |
| 7 | 1700 | 14.7 | 158 | 18.6 | 9.3 | 27 | ○ | ○ |
| 8 | 1730 | 15.1 | 149 | 18.4 | 9.4 | 27 | ○ | ○ |
| 9 | 1530 | 14.4 | 140 | 18.4 | 9.6 | 26 | ○ | ○ |
| 10 | 1510 | 14.5 | 157 | 18.3 | 9.5 | 27 | ○ | ○ |
| 11 | 1590 | 15.2 | 155 | 18.6 | 9.6 | 27 | ○ | ○ |
| 12 | 1710 | 15.7 | 167 | 18.1 | 9.6 | 27 | ○ | ○ |
| Com. Ex. 1 | 1500 | 12.7 | 121 | 19.3 | 8.2 | 21 | ○ | x |

EXAMPLES 13 TO 22

Resin compositions were obtained in the same manner as in Examples 1 to 12 except that the components used in Examples 1 to 12 were changed to the components shown in Table 3.

Each physical property of the obtained resin compositions was examined in the same manner as in Examples 1 to 12. The results are shown in Table 4.

Each code shown in Table 3 is as follows:

(Fine particles (F))
F-1: Fine particles having an average particle diameter of 50 μm, made of a thermoplastic polymer having a number average molecular weight of 40000 and a recurring unit represented by the formula:

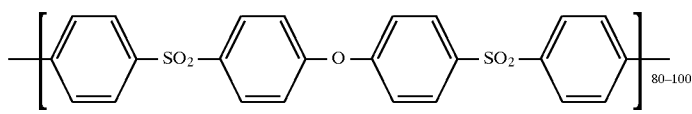

(Thermoplastic polymer (G))
G-1: Thermoplastic polymer having a number average molecular weight of 6400, represented by the formula:

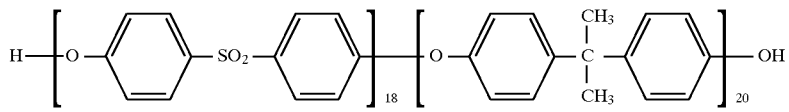

(Polysiloxane (H))

H-1: Polydimethylsiloxane having 3 epoxy groups (functional groups) on both ends of and in its molecular chain, an epoxy equivalent of 300 and a number average molecular weight of 990, represented by the formula:

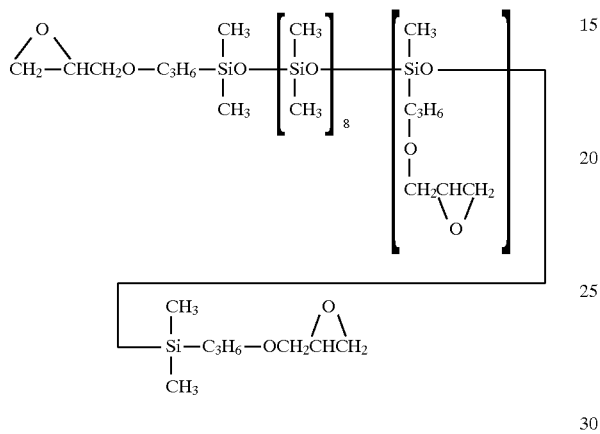

(Fine particles (I))

I-1: Fine particles having an average particle diameter of 10 μm, made of a rubber-like crosslinked silicone polymer having a skelton of siloxane, prepared by polymerizing 83% by weight of dimethylsiloxane, 7% by weight of diphenylsiloxane and 10% by weight of methylvinylsiloxane with the aid of dichlorobenzoyl peroxide (Polymer (J))

J-1: Brominated bisphenol A having a hydroxyl equivalent of 272 and a molecular weight of 544, represented by the formula:

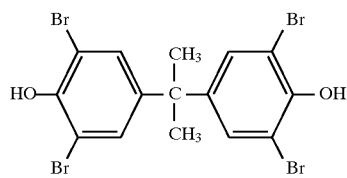

J-2: Brominated bisphenol F having a hydroxyl equivalent of 258 and a molecular weight of 516, represented by the formula:

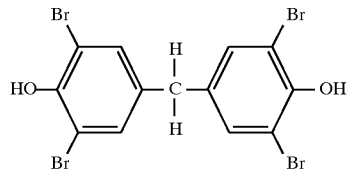

(Butadiene-acrylonitrile copolymer (K))

K-1: Butadiene-acrylonitrile copolymer having a number average molecular weight of 1500, represented by the formula:

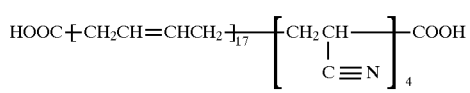

(Hydrogenated polyisoprene (L))

L-1: Hydrogenated polyisoprene having epoxy groups (functional groups) on both ends of its molecular chain, an epoxy equivalent of 5000 and a number average molecular weight of 10000, represented by the formula:

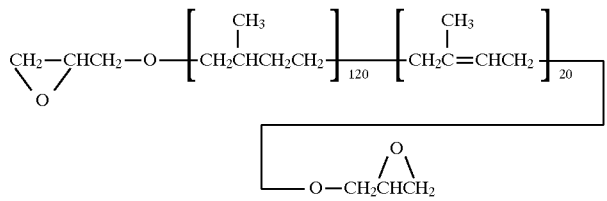

(Compound (M))

M-1: Poly(ether imide) having a number average molecular weight of 7500 and a recurring unit represented by the formula:

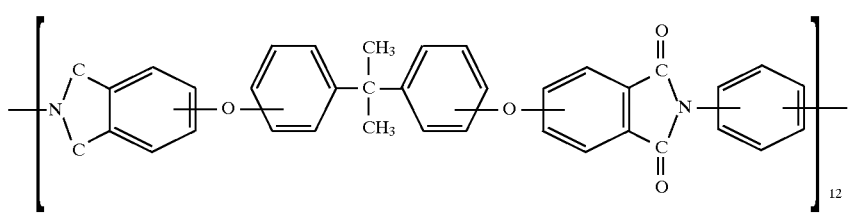

M-2: Poly(phenylene oxide) having a number average molecular weight of 50000 and a recurring unit represented by the formula:

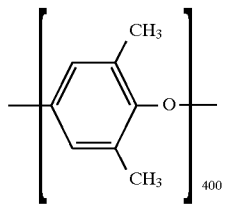

Also, it is understood that no crack was generated at all on the surface of the molded motors and the molded transformers obtained in Examples 1 to 22 after the thermal cycle test was carried out, that is, the molded motors and the molded transformers obtained in Examples 1 to 22 are more excellent in crack resistance in comparison with the molded motor and the molded transformer obtained in Comparative Example 1.

Moreover, from the results shown in Table 2 and Table 4, it is understood that the test pieces obtained in Examples 13

TABLE 3

| | Components (amount: parts by weight) | | | | | | | | |
|---|---|---|---|---|---|---|---|---|---|
| | Epoxy resin (A) | | | Acid anhydride (B) (THPA) | | Curing | Coupling | | |
| Ex. No. | A-21 (Amount) | E-807 (Amount) | Number of epoxy groups*1 | Amount | Number of acid anhydride groups*2 | accelerator (C)(2E4MZ) (Amount) | agent (D)(KBM403) (Amount) | Filler (E) (RD-8) (Amount) | Other component (Amount) |
| 13 | 50 | 50 | 0.371 | 55.4 | 0.334 | 0.3 | 5.4 | 536.9 | F-1 (17.9) |
| 14 | 50 | 50 | 0.371 | 54.9 | 0.331 | 0.3 | 5.4 | 535.4 | G-1 (17.9) |
| 15 | 50 | 50 | 0.371 | 64.3 | 0.387 | 0.3 | 5.6 | 564.4 | H-1 (17.9) |
| 16 | 50 | 50 | 0.371 | 55.4 | 0.334 | 0.3 | 5.4 | 536.9 | I-1 (17.9) |
| 17 | 50 | 50 | 0.371 | 45.6 | 0.275 | 0.3 | 5.1 | 506.6 | J-1 (17.9) |
| 18 | 50 | 50 | 0.371 | 45.1 | 0.272 | 0.3 | 5.1 | 505.1 | J-2 (17.9) |
| 19 | 50 | 50 | 0.371 | 55.4 | 0.334 | 0.3 | 5.4 | 536.9 | K-1 (17.9) |
| 20 | 50 | 50 | 0.371 | 56.0 | 0.337 | 0.3 | 5.4 | 538.8 | L-1 (17.9) |
| 21 | 50 | 50 | 0.371 | 55.4 | 0.334 | 0.3 | 5.4 | 536.9 | M-1 (17.9) |
| 22 | 50 | 50 | 0.371 | 55.4 | 0.334 | 0.3 | 5.4 | 536.9 | M-2 (17.9) |

(Note)
*1Based on the amount of epoxy resin (A) described in Table 3
*2Based on the amount of acid anhydride (B) described in Table 3

TABLE 4

| | Physical Properties | | | | | | | |
|---|---|---|---|---|---|---|---|---|
| | Modulus of flexural | Bending | Glass transition | Coefficient of thermal expansion | Value of fracture toughness | | Crack charactistics | |
| Ex. No. | elasticity (kg/mm$^2$) | strength (kg/mm$^2$) | temperature (Tg) (°C.) | (× 10$^{-6}$) (°C.$^{-1}$) | (K$_{IC}$) (N/mm$^{3/2}$) | Crack index | Molded motor | Molded transformer |
| 13 | 1720 | 14.8 | 165 | 18.4 | 10.4 | 28 | ○ | ○ |
| 14 | 1730 | 14.9 | 162 | 18.1 | 10.8 | ≧30 | ○ | ○ |
| 15 | 1520 | 14.2 | 152 | 17.3 | 10.6 | ≧30 | ○ | ○ |
| 16 | 1560 | 13.7 | 155 | 17.7 | 10.4 | 28 | ○ | ○ |
| 17 | 1760 | 14.6 | 149 | 18.0 | 9.5 | ≧30 | ○ | ○ |
| 18 | 1780 | 14.7 | 144 | 17.6 | 9.6 | ≧30 | ○ | ○ |
| 19 | 1610 | 13.7 | 153 | 17.6 | 10.3 | ≧30 | ○ | ○ |
| 20 | 1630 | 13.8 | 151 | 17.9 | 10.4 | ≧30 | ○ | ○ |
| 21 | 1730 | 14.8 | 164 | 18.3 | 10.8 | ≧30 | ○ | ○ |
| 22 | 1740 | 14.7 | 160 | 18.0 | 10.7 | ≧30 | ○ | ○ |

From the results shown in Table 2 and Table 4, it is understood that the test pieces obtained in Examples 1 to 22 are higher in glass transition temperature, greater in modulus of flexural elasticity, bending strength and value of fracture toughness, that is, more excellent in mechanical properties, smaller in coefficient of thermal expansion, that is, more excellent in thermal resistance, and greater in crack index for thermal shock, that is, more excellent in crack resistance in comparison with the test piece obtained in Comparative Example 1.

to 22 are higher in the glass transition temperature, greater in modulus of flexural elasticity and value of fracture toughness, smaller in coefficient of thermal expansion and greater in crack index in comparison with the test pieces obtained in Examples 1 to 12. Therefore, it is understood that the test pieces obtained in Examples 13 to 22 are more excellent in mechanical properties, thermal resistance and crack resistance in comparison with the test pieces obtained in Examples 1 to 12.

EXAMPLES 23 TO 26 AND COMPARATIVE EXAMPLE 2

Resin compositions were obtained in the same manner as in Examples 1 to 12 except that the components used in Examples 1 to 12 were changed to the components shown in Table 5.

Each physical property of the obtained resin compositions was examined in the same manner as in Examples 1 to 12. The results are shown in Table 6.

Figure 8:
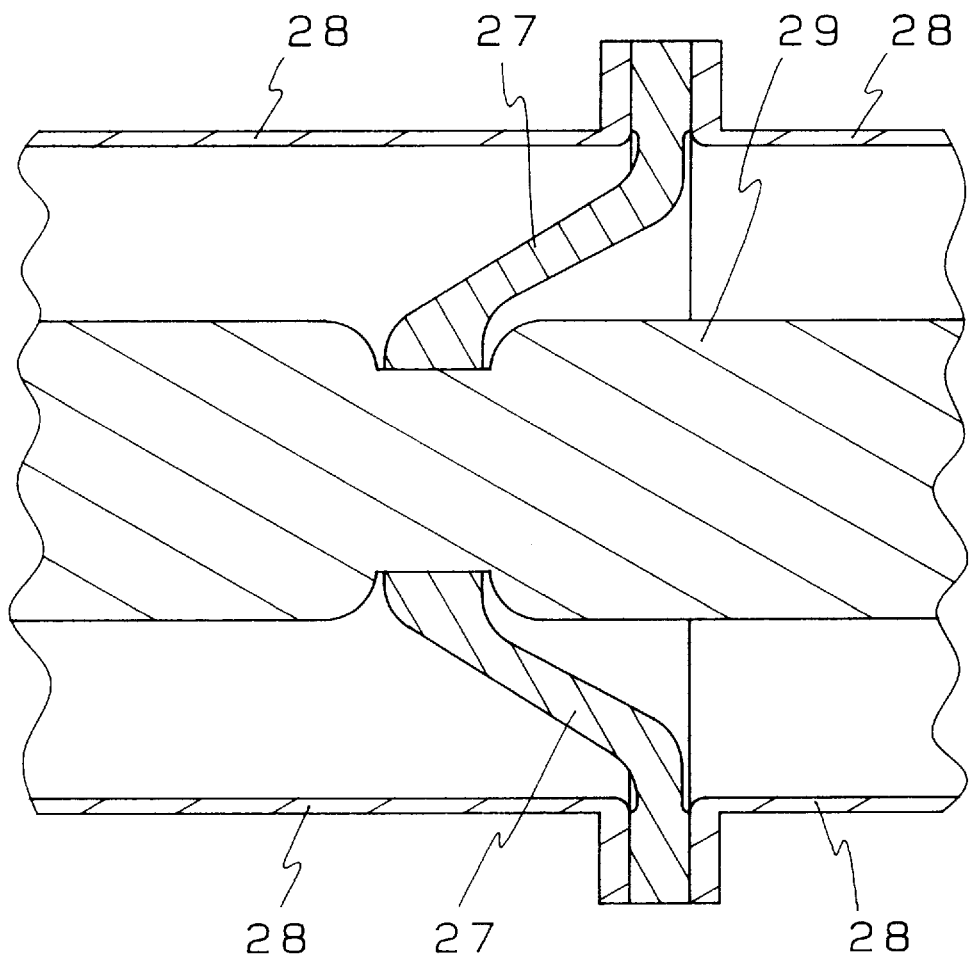
FIG. 8 is a schematic cross section showing one embodiment of a gas insulated apparatus which is one embodiment of a molded product used for apparatus for high voltage of the present invention.

In Examples 23 to 26 and Comparative Example 2, by using a mold having a shape suitable for the cone-type spacer 27 for a gas insulated apparatus shown in FIG. 8 as the metal mold 5 of the molding apparatus 1 shown in FIG. 1, the cone-type spacer 27 for a gas insulating apparatus having a shape shown in FIG. 8 was produced in the same manner as in the case of the molded transformer shown in FIG. 7.

Crack characteristics of the obtained cone-type spacer were examined by carrying out a test in the same manner as the thermal cycle test of the molded transformer except that the conditions of at 160° C. for 2 hours in the thermal cycle test of the molded transformer was changed to those of at 110° C. for 2 hours.

FIG. 8 is a schematic cross section of a gas insulated apparatus. In FIG. 8, an electrode for high voltage 29 is penetrated through the center of the cone-type spacer 27. A cylindrical earth electrode 28 and the electrode for high voltage 29 are made of aluminum.

A code shown in Table 5 is as follows:

(Filler (E))

AS-20: Alumina filler having an average particle diameter of 23 $\mu$m and a maximum particle diameter of 150 $\mu$m, in which the content of particles having a particle diameter of not more than 5 $\mu$m is 15% by weight commercially available from SHOWA DENKO K.K. under the trade name of AS-20

TABLE 5

| | Components (amount: parts by weight) | | | | | | | | | |
|---|---|---|---|---|---|---|---|---|---|---|
| | Epoxy resin (A) | | | | Acid anhydride (B) (THPA) | | Curing | Coupling | | |
| | | | | Number | | Number of | accelerator | agent | Filler (E) | |
| Ex. No. | A-21 (Amount) | E-807 (Amount) | E-828 (Amount) | of epoxy group*1 | Amount | acid anhydride groups*2 | (C)(2E4MZ) (Amount) | (D)(KBM403) (Amount) | RD-8 (Amount) | AS-20 (Amount) |
| 23 | 50 | 50 | — | 0.371 | 55.4 | 0.334 | 0.3 | 6.5 | — | 650 |
| 24 | 50 | 50 | — | 0.371 | 55.4 | 0.334 | 0.3 | 6.5 | 195 | 455 |
| 25 | 50 | 50 | — | 0.371 | 55.4 | 0.334 | 0.3 | 6.5 | 325 | 325 |
| 26 | 50 | 50 | — | 0.371 | 55.4 | 0.334 | 0.3 | 6.5 | 455 | 195 |
| Com. Ex. 2 | — | — | 100 | 0.528 | 78.6 | 0.473 | 0.3 | 7.5 | — | 746 |

(Note)
*1Based on the amount of epoxy resin (A) described in Table 5
*2Based on the amount of acid anhydride (B) described in Table 5

TABLE 6

| | Physical Properties | | | | | | | |
|---|---|---|---|---|---|---|---|---|
| | Modulus of flexural | Bending | Glass transition | Coefficient of thermal expansion | Value of fracture toughness | | Crack charactistics | |
| Ex. No. | elasticity (kg/mm$^2$) | strength (kg/mm$^2$) | temperature (Tg) (°C.) | ($\times 10^{-6}$) (°C.$^{-1}$) | ($K_{IC}$) (N/mm$^{3/2}$) | Crack index | Molded motor | Cone-type spacer |
| 23 | 2030 | 13.6 | 143 | 27.3 | 8.8 | 16 | Δ | ○ |
| 24 | 2080 | 13.9 | 149 | 24.9 | 8.8 | 21 | Δ | ○ |
| 25 | 2060 | 14.3 | 151 | 21.2 | 9.1 | 24 | ○ | ○ |
| 26 | 2090 | 14.5 | 151 | 19.5 | 9.4 | 24 | ○ | ○ |
| Com. Ex. 2 | 1980 | 11.3 | 115 | 29.1 | 7.1 | 9 | x | x |

From the results shown in Table 6, it is understood that the test pieces obtained in Examples 23 to 26 are higher in glass transition temperature, greater in modulus of flexural elasticity, bending strength and value of fracture toughness, that is, more excellent in mechanical properties, smaller in coefficient of thermal expansion, that is, more excellent in thermal resistance and extremely greater in crack index for thermal shock, that is, more excellent in crack resistance in comparison with the test piece obtained in Comparative Example 2.

Also, it is understood that cracks were hardly generated on the surface of the molded motors and the cone-type spacers obtained in Examples 23 to 26 after the thermal cycle test was carried out, that is, the molded motors and the cone-type spacers obtained in Examples 23 to 26 are more excellent in crack resistance in comparison with the molded motor and the cone-type spacer obtained in Comparative Example 2.

EXAMPLES 27 TO 28 AND COMPARATIVE EXAMPLE 3

Specimens in which inserted materials made of iron were embedded were produced by using a molding apparatus 1 shown in FIG. 1.

Among the components shown in Table 7, the molding apparatus 1 was charged with the curing accelerator (C) through the supply port 2 and with a mixture comprising the components for the resin composition not containing the curing accelerator (C) through the supply port 3, respectively. The curing accelerator (C) and the mixture were mixed together in the mixer 4 at 45° C. to give resin compositions. The metal mold 5 was provided with a thick and cylindrical inserted material made of iron, having an outside diameter of 100 mm, a length of 100 mm and a shape shown as a numeral 10 in FIG. 2. The metal mold 5 was heated to 150° C. and the resin compositions were injected into the metal mold 5 through the injection nozzle 6 under a pressure of 40 kg/cm$^2$. The pressure in the metal mold was maintained for 10 minutes, and the resin compositions were molded. The obtained cured materials were aged at 170° C. for about 1 hour to give specimens having a thickness of 1 mm respectively.

The metal mold 5 shown in FIG. 1 has a shape shown in a schematic illustrative drawing of a metal mold shown in FIG. 2. As shown in FIG. 2, a fiber sheet is not used in Examples 27 to 28 and Comparative Example 3.

Crack characteristics of the obtained specimens were examined in accordance with the following method. The results are shown in Table 7.

The obtained specimens were repeatedly subjected to a thermal cycle test comprising cooling the specimens at −60° C. for 3 hours and heating the specimens at 160° C. for 2 hours 100 times. The generation of cracks on the surface of the specimens was observed. The marks shown in the "Crack characteristics" of Table 7 are the same as those described in the item (G) in Examples 1 to 12.

EXAMPLES 29 TO 32 AND COMPARATIVE EXAMPLES 4 TO 5

Specimens having a thickness of 1 mm were produced in the same manner as in Examples 27 to 28 except that all surfaces of the thick and cylindrical inserted material made of iron, having an outside diameter of 100 mm, a length of 100 mm and a shape shown as a numeral 10 in FIG. 3 were covered with a web-like glass fiber sheet 11 having a thickness of 0.2 mm as shown in FIG. 3, and the metal mold 5 was provided with the inserted material.

Crack characteristics of the obtained specimens were examined in the same manner as in Examples 27 to 28. The results are shown in Table 7.

A filament shown in Table 7 is a glass filament having an average length of 100 μm.

TABLE 7

| | Components (amount: parts by weight) | | | | | | | | |
|---|---|---|---|---|---|---|---|---|---|
| | Epoxy resin (A) | | Acid anhydride (B) (THPA) | | Curing accelerator | Coupling agent | Filler (E) | | Physical property |
| Ex. No. | Component(s) (Amount) | Number of epoxy groups*[1] | Amount | Number of acid anhydride groups*[2] | (C)(2E4MZ) (Amount) | (D)(KBM403) (Amount) | (RD-8) (Amount) | Filament (Amount) | Crack characteristics |
| 27 | A-21 (50) E-807 (50) | 0.077 0.294 | 55.4 | 0.334 | 5.0 | 3.8 | 273.7 | 109.5 | ◯ |
| 28 | A-4 (50) E-807 (50) | 0.179 0.294 | 70.6 | 0.425 | 5.0 | 4.2 | 299.7 | 119.9 | ◯ |
| 29 | A-21 (50) E-807 (50) | 0.077 0.294 | 55.4 | 0.334 | 5.0 | 1.1 | 107.7 | — | ◯ |
| 30 | A-4 (50) E-807 (50) | 0.179 0.294 | 70.6 | 0.425 | 5.0 | 1.2 | 117.9 | — | ◯ |
| 31 | A-21 (50) E-807 (50) | 0.077 0.294 | 55.4 | 0.334 | 5.0 | 1.6 | — | — | ◯ |
| 32 | A-4 (50) E-807 (50) | 0.179 0.294 | 70.6 | 0.425 | 5.0 | 1.8 | — | — | ◯ |
| Com. Ex. 3 | E-828 (100) | 0.526 | 78.6 | 0.473 | 5.0 | 4.4 | 313.3 | 125.3 | x |
| Com. Ex. 4 | E-828 (100) | 0.526 | 78.6 | 0.473 | 5.0 | — | — | — | x |
| Com. Ex. 5 | E-828 (100) | 0.526 | 78.6 | 0.473 | 5.0 | 1.2 | 123.2 | — | x |

(Note)
*[1]Based on the amount of epoxy resin (A) described in Table 7
*[2]Based on the amount of acid anhydride (B) described in Table 7

From the results shown in Table 7, it is understood that no crack was generated at all on the surface of the specimens produced in Examples 27 to 32 after the thermal cycle test was carried out, that is, the specimens produced in Examples 27 to 32 are excellent in crack resistance.

The epoxy resin composition for molding of the present invention contains an epoxy resin having a skeleton of spiro ring, a skeleton of brominated bisphenol A, a skeleton of brominated bisphenol F, a skeleton of single benzene ring or a skeleton of naphthalene ring. Accordingly, the cured material prepared by curing the resin composition has high glass transition temperature, excellent mechanical properties such as, in particular, high mechanical strength and high toughness, and excellent thermal resistance. Moreover, the molded products used for apparatus for high voltage such as a molded transformer, a molded motor and a gas insulated apparatus, which are obtained by the process for preparing the molded product comprising using the resin composition of the present invention are excellent in productivity, formability and, in particular, crack resistance, and have high reliability.

Moreover, when the epoxy resin composition for molding of the present invention contains a thermoplastic polymer, a silicone polymer, a polybutadiene elastomer and the like, the resin composition shows improved fracture toughness. When the resin composition is used, the generation of tension can be sufficiently restrained in the obtained molded product. Therefore, crack resistance, productivity, formability and reliability of the molded product are improved.

As mentioned above, if the epoxy resin composition for molding of the present invention is used, glass transition temperature of the cured material prepared by curing the epoxy resin composition will be higher than that of conventional cured materials. Therefore, it is possible to produce a molded product used for apparatus for high voltage, which has improved mechanical properties at high temperatures and heightened mechanical critical temperatures in use, that is, higher reliability. Moreover, it is possible that the scale of the molded product is reduced and the capacity of the molded product is increased.

In addition to the ingredients used in the Examples, other ingredients can be used in the Examples as set forth in the specification to obtain substantially the same results.

What is claimed is:

1. A molded product for an apparatus used for high voltage which is produced from an epoxy resin composition comprising:

an epoxy resin (A) comprising from 50 to 100% by weight of an epoxy resin (A-2) represented by the general formula (II):

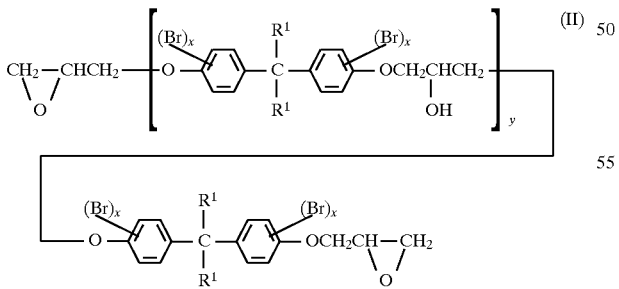

wherein each of $R^1$ is independently hydrogen atom or methyl group, each of x is independently an integer of 1 to 4, and the average of y is 0 to 4; and at least one resin selected from the group consisting of a bisphenol A epoxy resin, a bisphenol F type epoxy resin, and a biphenyl epoxy resin;

an acid anhydride (B);

a curing accelerator (C);

at least one coupling agent (D) selected from the group consisting of epoxysilane coupling agents, phenylaminosilane coupling agents, mercaptosilane coupling agents and titanate coupling agents; and a filler (E) comprising at least one of silica fillers or alumina fillers, wherein the ratio of the number of acid anhydride groups of said acid anhydride (B) to the number of epoxy groups of said epoxy resin (A) is 0.5 to 1.5, the amount of said curing accelerator (C) is 0.5 to 10 parts by weight based on 100 parts by weight of said epoxy resin (A), the amount of said coupling agent (D) is 0.05 to 5 parts by weight based on 100 parts by weight of said filler (E), and the content of said filler (E) is 35 to 95% by weight of the resin composition.

2. In a molded transformer, the improvement comprising producing a molded transformer having excellent crack resistance and high reliability by using an epoxy resin composition for molding comprising:

an epoxy resin (A) comprising from 50 to 100% by weight of an epoxy resin (A-2) represented by the general formula (II):

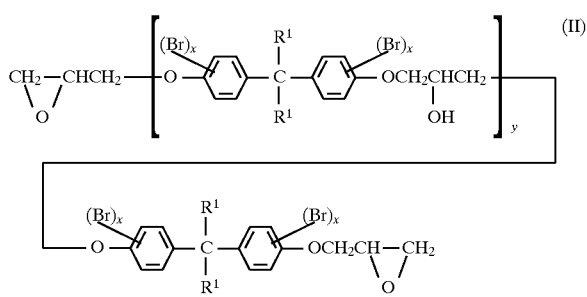

wherein each of $R^1$ is independently hydrogen atom or methyl group, each of x is independently an integer of 1 to 4, and the average of y is 0 to 4; and at least one resin selected from the group consisting of a bisphenol A epoxy resin, a bisphenol F type epoxy resin, and a biphenyl epoxy resin;

an acid anhydride (B);

a curing accelerator (C);

at least one coupling agent (D) selected from the group consisting of epoxysilane coupling agents, phenylaminosilane coupling agents, mercaptosilane coupling agents and titanate coupling agents; and a filler (E) comprising at least one of silica fillers or alumina fillers, wherein the ratio of the number of acid anhydride groups of said acid anhydride (B) to the number of epoxy groups of said epoxy resin (A) is 0.5 to 1.5, the amount of said curing accelerator (C) is 0.5 to 10 parts by weight based on 100 parts by weight of said epoxy resin (A), the amount of said coupling agent (D) is 0.05 to 5 parts by weight based on 100 parts by weight of said filler (E), and the content of said filler (E) is 35 to 95% by weight of the resin composition.

3. In a molded motor, the improvement comprising producing a molded motor having excellent crack resistance and high reliability by using an epoxy resin composition for molding comprising:

an epoxy resin (A) comprising from 50 to 100% by weight of an epoxy resin (A-2) represented by the general formula (II):

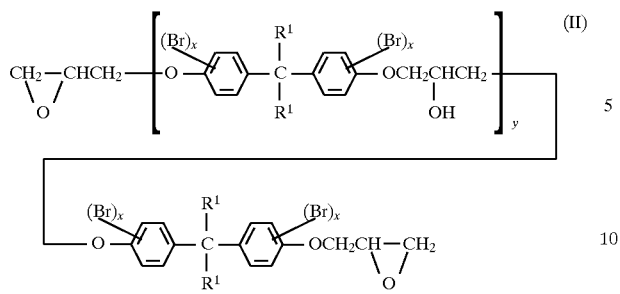

wherein each of $R^1$ is independently hydrogen atom or methyl group, each of x is independently an integer of 1 to 4, and the average of y is 0 to 4; and at least one resin selected from the group consisting of a bisphenol A epoxy resin, a bisphenol F type epoxy resin, and a biphenyl epoxy resin;

an acid anhydride (B);

a curing accelerator (C);

at least one coupling agent (D) selected from the group consisting of epoxysilane coupling agents, phenylaminosilane coupling agents, mercaptosilane coupling agents and titanate coupling agents; and a filler (E) comprising at least one of silica fillers or alumina fillers, wherein the ratio of the number of acid anhydride groups of said acid anhydride (B) to the number of epoxy groups of said epoxy resin (A) is 0.5 to 1.5, the amount of said curing accelerator (C) is 0.5 to 10 parts by weight based on 100 parts by weight of said epoxy resin (A), the amount of said coupling agent (D) is 0.05 to 5 parts by weight based on 100 parts by weight of said filler (E), and the content of said filler (E) is 35 to 95% by weight of the resin composition.

4. A bushing or a spacer which is produced from an epoxy resin composition comprising:

an epoxy resin (A) comprising from 50 to 100% by weight of an epoxy resin (A-2) represented by the general formula (II):

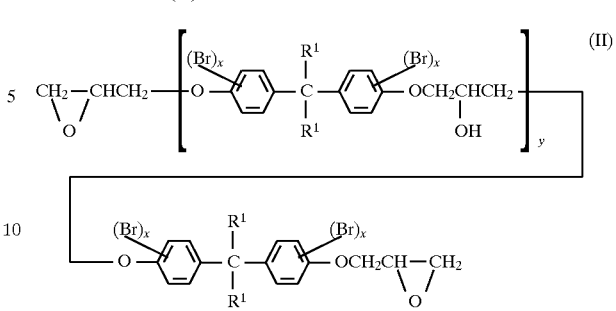

wherein each of $R^1$ is independently hydrogen atom or methyl group, each of x is independently an integer of 1 to 4, and the average of y is 0 to 4; and at least one resin selected from the group consisting of a bisphenol A epoxy resin, a bisphenol F type epoxy resin, and a biphenyl epoxy resin;

an acid anhydride (B);

a curing accelerator (C);

at least one coupling agent (D) selected from the group consisting of epoxysilane coupling agents, phenylaminosilane coupling agents, mercaptosilane coupling agents and titanate coupling agents; and a filler (E) comprising at least one of silica fillers or alumina fillers, wherein the ratio of the number of acid anhydride groups of said acid anhydride (B) to the number of epoxy groups of said epoxy resin (A) is 0.5 to 1.5, the amount of said curing accelerator (C) is 0.5 to 10 parts by weight based on 100 parts by weight of said epoxy resin (A), the amount of said coupling agent (D) is 0.05 to 5 parts by weight based on 100 parts by weight of said filler (E), and the content of said filler (E) is 35 to 95% by weight of the resin composition.

* * * * *